United States Patent
Chang et al.

(10) Patent No.: US 10,602,354 B2
(45) Date of Patent: Mar. 24, 2020

(54) KEY PROCESSING METHOD IN DUAL CONNECTIVITY MODE AND DEVICE

(71) Applicant: Huawei Technologies Co., Ltd., Shenzhen (CN)

(72) Inventors: Junren Chang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 643 days.

(21) Appl. No.: 15/143,113

(22) Filed: Apr. 29, 2016

(65) Prior Publication Data

US 2016/0249210 A1 Aug. 25, 2016

Related U.S. Application Data

(63) Continuation of application No. PCT/CN2013/086469, filed on Nov. 1, 2013.

(51) Int. Cl.
*H04M 1/66* (2006.01)
*H04W 12/04* (2009.01)
(Continued)

(52) U.S. Cl.
CPC .......... *H04W 12/04* (2013.01); *H04L 9/0819* (2013.01); *H04L 63/062* (2013.01); *H04L 69/14* (2013.01); *H04L 2209/80* (2013.01); *H04L 2463/061* (2013.01); *H04W 36/0069* (2018.08); *H04W 76/14* (2018.02); *H04W 88/08* (2013.01)

(58) Field of Classification Search
None
See application file for complete search history.

(56) References Cited

U.S. PATENT DOCUMENTS 9,467,849 B2 10/2016 Zhang
2008/0070577 A1* 3/2008 Narayanan ............ H04L 63/062
455/436

(Continued)

FOREIGN PATENT DOCUMENTS

CN 1627716 A 6/2005
CN 102740289 A 10/2012

(Continued)

OTHER PUBLICATIONS

"3$^{rd}$ Generation Partnership Project; Technical Specification Group Services and System Aspects; 3GPP System Architecture Evolution (SAE); Security architecture (Release 12)," 3GPP TS 33.401, V12.8.1, pp. 1-121, 3$^{rd}$ Generation Partnership Project, Valbonne, France (Jun. 2013).

(Continued)

*Primary Examiner* — Jinsong Hu
*Assistant Examiner* — Alexander J Yi
(74) *Attorney, Agent, or Firm* — Leydig, Voit & Mayer, Ltd.

(57) ABSTRACT

Embodiments of the present disclosure disclose a key processing method in dual connectivity mode and a device, which ensure communication security of UE in dual connectivity mode. The method according to the embodiments of the present disclosure includes: of a first base station and a second base station that have a communication connection to a terminal each, receiving, by the second base station, first request information sent by the first base station, where the first request information is used to request the second base station to generate a key used for communication with the terminal, and generating, by the second base station based on a security key carried in the first request information, the key used for communication with the terminal.

10 Claims, 10 Drawing Sheets

(51) Int. Cl.
   *H04L 29/06* (2006.01)
   *H04L 9/08* (2006.01)
   *H04W 76/14* (2018.01)
   *H04W 88/08* (2009.01)
   *H04W 36/00* (2009.01)

(56) References Cited

U.S. PATENT DOCUMENTS

| | | | | |
|---|---|---|---|---|
| 2010/0178933 | A1* | 7/2010 | Du | H04W 74/08 455/456.1 |
| 2011/0086640 | A1* | 4/2011 | Iwamura | H04L 63/06 455/436 |
| 2014/0308921 | A1 | 10/2014 | Zhang | |
| 2015/0126154 | A1 | 5/2015 | Yang | |
| 2015/0264612 | A1* | 9/2015 | Baek | H04W 12/04 370/331 |
| 2016/0157095 | A1* | 6/2016 | Zhang | H04W 52/0209 380/273 |

FOREIGN PATENT DOCUMENTS

| | | |
|---|---|---|
| CN | 103188663 A | 7/2013 |
| WO | WO 2013097672 A1 | 7/2013 |
| WO | WO 2013116976 A1 | 8/2013 |
| WO | 2015037926 A1 | 3/2015 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.7.0, pp. 1-209, 3$^{rd}$ Generation Partnership Project, Valbonne, France (Sep. 2013).

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.5.0, pp. 1-347, 3$^{rd}$ Generation Partnership Project, Valbonne, France (Sep. 2013).

"3rd Generation Partnership Project; Technical Specification Group Radio Access Network; Evolved Universal Terrestrial Radio Access Network (E-UTRAN); X2 application protocol (X2AP) (Release 11)," 3GPP TS 36.423, V11.6.0, pp. 1-144, 3$^{rd}$ Generation Partnership Project, Valbonne, France (Sep. 2013).

"Information technology—Security techniques—Hash-functions—Part3: Dedicated hast-functions," International Standard, ISO/IEC 10118-3:2004(E), pp. 1-102, International Organization for Standardization, Geneva, Switzerland (Mar. 1, 2004).

"Security aspects for independent PDCP," 3GPP TSG RAN2 Meeting #83, Barcelona, Spain, R2-132675, 3$^{rd}$ Generation Partnership Project, Valbonne, France (Aug. 19-23, 2013).

Krawczyk et al., "HMAC: Keyed-Hashing for Message Authentication," Networking Working Group, Request for comments: 2104, pp. 1-9, IETF Trust, Reston, Virginia (Feb. 1997).

3GPP TSG RAN WG2 Meeting #83 Barcelona, Spain, Aug. 19-23, 2013,R2-132818,Security aspects for dual connectivity,Intel Corporation,total 3 pages.

3GPP TSG-RAN WG2 Meeting #83 Barcelona, Spain, Aug. 19-23, 2013,R2-132427, Location of Security and RRM functions RBC, RAC,Panasonic,total 4 pages.

* cited by examiner

Of a first base station and a second base station that have a communication connection to a terminal each, the second base station receives first request information sent by the first base station, where the first request information is used to request the second base station to generate a key used for communication with the terminal  — S41

The second base station generates, based on a security key carried in the first request information, the key used for communication with the terminal — S42

FIG. 4

A terminal that has a communication connection to a first base station and a communication connection to a second base station receives second request information sent by the first base station or the second base station, where the second request information is used to request the terminal to generate a key used for communication with the second base station — S51

The terminal generates, according to the received second request information, the key used for communication with the second base station — S52

FIG. 5

KEY PROCESSING METHOD IN DUAL CONNECTIVITY MODE AND DEVICE

CROSS-REFERENCE

This application is a continuation of International Patent Application No. PCT/CN2013/086469, filed on Nov. 1, 2013, which is hereby incorporated by reference in its entirety.

TECHNICAL FIELD

The present disclosure relates to the field of communications technologies, and in particular, to a key processing method in dual connectivity mode and a device.

BACKGROUND

At present, to improve a transmission rate of a wireless network and enhance user experience, the 3rd generation partnership (3GPP) organization is having a discussion to establish a new research project, that is, small cell network enhancements. As shown in FIG. 1, in the figure, F1 represents a low-frequency carrier with a feature of having relatively large coverage but relatively scarce resources; F2 represents a high-frequency carrier with a feature of having relatively small coverage but relatively rich resources. In a conventional 2G/3G network, generally, a carrier of a relatively low frequency is used, for example, a low-frequency carrier having a frequency of F1 is used to provide services for users.

With popularization of smartphones, users have a higher requirement on a wireless transmission rate. To meet the requirement of the users, high-frequency carriers that have rich resources need to be used gradually, to provide services for the users. Because high-frequency carriers have a feature of small coverage, a base station that uses a high-frequency carrier to provide small coverage is usually referred to as a small base station (or micro base station), and an area covered by the small base station is referred to as a small cell (Small Cell). A main idea of small cell enhancements is that user equipment (UE) may aggregate carriers from a macro cell and from a small cell to obtain more available radio resources, so as to improve a data transmission rate. FIG. 2A and FIG. 2B show a data scheduling method and a data transmission method of UE in dual connectivity mode, where in the figures, a Macro Cell is a cell of a macro base station, and a Small Cell is a cell of a micro base station. Generally, the macro base station is selected as a master base station (Master eNB, MeNB), and the micro base station is selected as a secondary base station (Secondary eNB, SeNB). In dual connectivity mode, one possible trend is that the macro base station serves as a primary control site and is responsible for mobility management of UE, data packet splitting, and the like.

Modes in which the UE performs a dual connectivity operation with the MeNB and the SeNB are mainly classified into the following two situations:

Situation 1: In a process in which the UE communicates with the MeNB and the SeNB, the MeNB can constantly provide reliable coverage, that is, the MeNB can constantly provide reliable signal quality for the UE.

Situation 2: In a process in which the UE communicates with the MeNB and the SeNB, the MeNB cannot ensure that reliable coverage can be constantly provided, that is, the MeNB cannot provide reliable signal quality for the UE constantly.

Data transmission between the UE and a base station requires keys, for example, a control-plane message cipher key, an integrity protection key, and a user-plane data cipher key. Refer to FIG. 3 for a process of generating a security key $K_{eNB}$ in an existing long term evolution (LTE) system, which includes:

1. In a process of accessing a network by UE, first, a mobility management entity (MME) and the UE separately generate an access security management entity key $K_{ASME}$ based on UE security context information stored by the mobility management entity and by the UE, for example, parameters such as a key K (that is, Key), a cipher key (CK), and an integrity protection key (Integrity Key, IK) shown in FIG. 3.

2. The UE and the MME further generate a security key $K_{eNB}$ based on the generated $K_{ASME}$.

Specifically, in this step, a process of deducing, by the UE and the MME, $K_{eNB}$ based on $K_{ASME}$ is as follows:

First, determine the following parameters:

FC=0x11;

P0=uplink non-access stratum COUNT, where a value of COUNT herein includes a hyper frame number and a sequence number;

L0=a length of the value of uplink non-access stratum COUNT;

Then, combine the foregoing determined parameters to form an input string S.

Finally, perform calculation according to an HMAC-SHA-256 key derivation function to obtain: $K_{eNB}$=HMAC-SHA-256($K_{ASME}$, S), where the key derivation function is stipulated by standards IETF RFC 2104 (1997) and ISO/IEC 10118-3:2004.

After the UE and the MME both generate $K_{eNB}$, the MME further sends $K_{eNB}$ to an eNB. Further, the UE and the eNB generate, based on $K_{eNB}$, keys used for data transmission, for example, a control-plane message cipher key, an integrity protection key, and a user-plane data cipher key. A specific process is as follows:

First, determine the following parameters:

FC=0x15;

P0=algorithm similarity identification value (which is determined according to Table 1);

L0=a length of the algorithm similarity identification value;

P1=algorithm identifier; and

L1=a length of the algorithm identifier;

TABLE 1

| Algorithm Similarity Identification Value | |
| --- | --- |
| Algorithm similarity identification value | Value |
| RRC encryption algorithm | 0x03 |
| RRC integrity protection algorithm | 0x04 |
| User-plane data encryption algorithm | 0x05 |

Then, combine the foregoing determined parameters to form an input string S.

Finally, perform calculation according to an HMAC-SHA-256 key derivation function to obtain: Key=HMAC-SHA-256($K_{eNB}$, S), where for different parameters obtained according to Table 1, $K_{up-enc}$ (that is, a user-plane data cipher key), $K_{CP-enc}$ (that is, a control-plane RRC cipher key), and $K_{CP-int}$ (that is, a control-plane RRC integrity protection key) can be separately obtained according to the foregoing formula. The key derivation function herein is stipulated by standards IETF RFC 2104 (1997) and ISO/IEC 10118-3: 2004.

When the UE works in coverage of the MeNB and in coverage of the SeNB at the same time, the UE may need to separately perform data transmission with the two base stations based on different security keys; the UE may also separately perform data transmission with the two base stations based on a same security key. However, in an existing long term evolution (LTE) system, generation of a key used for data transmission is designed for a scenario in which the UE works in coverage of one base station, and cannot be directly applied to a dual connectivity mode scenario in which the UE works in coverage of the MeNB and in coverage of the SeNB at the same time. Therefore, when the UE communicates with the MeNB and the SeNB at the same time, how to generate a key for data transmission is an urgent problem to be resolved.

SUMMARY

Embodiments of the present disclosure provide a key processing method in dual connectivity mode and a device, which ensure communication security of UE in dual connectivity mode, and can also avoid a communication failure during a key-rekey or key refresh process.

According to a first aspect, a key processing method in dual connectivity mode is provided, where the method includes:

of a first base station and a second base station that have a communication connection to a terminal each, receiving, by the second base station, first request information sent by the first base station, where the first request information is used to request the second base station to generate a key used for communication with the terminal; and generating, by the second base station based on a security key carried in the first request information, the key used for communication with the terminal.

With reference to the first aspect, in a first possible implementation manner, the generating, by the second base station based on a security key carried in the first request information, the key used for communication with the terminal specifically includes:

generating, by the second base station according to a first security key that is carried in the first request information and that is currently used by the first base station, the key used for communication with the terminal; or generating, by the second base station according to a first security key that is carried in the first request information and that is currently used by the first base station, a security key different from the first security key, and generating, according to the generated security key, the key used for communication with the terminal.

With reference to the first possible implementation manner of the first aspect, in a second possible implementation manner, the generating, by the second base station, a security key different from the first security key specifically includes:

determining, by the second base station, a physical cell identifier PCI and frequency information of at least one cell covered by the second base station, and generating, according to the PCI and the frequency information of the cell that are determined and the first security key, the security key different from the first security key.

With reference to the first aspect, in a third possible implementation manner, the generating, by the second base station based on a security key carried in the first request information, the key used for communication with the terminal specifically includes:

generating, by the second base station according to a second security key that is carried in the first request information and that is generated by a mobility management entity MME for the second base station, the key used for communication with the terminal.

With reference to the first aspect, the first possible implementation manner of the first aspect, the second possible implementation manner of the first aspect, or the third possible implementation manner of the first aspect, in a fourth possible implementation manner, the method further includes:

after receiving the first request information sent by the first base station, sending, by the second base station, second request information to the terminal, where the second request information is used to request the terminal to generate a key used for communication with the second base station.

In this embodiment of the present disclosure, the second request information includes a PCI and frequency information of a cell that are used to generate a security key of the second base station; or the second request information includes instruction information used to instruct the terminal to generate the second security key for the second base station.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, if the first base station and the second base station generate, based on a same security key, respective keys used for communication with the terminal, the method further includes:

receiving, by the second base station, first key refresh instruction information sent by the first base station, where the first key refresh instruction information is used to instruct the second base station to refresh the key used for communication with the terminal; and generating, by the second base station, a new security key according to information carried in the first key refresh instruction information, and generating, according to the new security key, a key used for communication with the terminal.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, if the first base station and the second base station generate, based on a same security key, respective keys used for communication with the terminal, the method further includes:

sending, by the second base station, first key refresh instruction information to the first base station after determining that key refresh needs to be performed, where the first key refresh instruction information is used to instruct the first base station to refresh the key used for communication with the terminal; and after the second base station receives first feedback information that is returned by the first base station to notify that current key refresh has been completed, and the second base station completes local key refresh, communicating, by the second base station, with the terminal by using a refreshed key.

With reference to the fifth possible implementation manner of the first aspect or with reference to the sixth possible implementation manner of the first aspect, in a seventh possible implementation manner, the method further includes:

after determining that key refresh needs to be performed, sending, by the second base station, second key refresh instruction information to the terminal, and after receiving second feedback information that is returned by the terminal to notify that current key refresh has been completed, communicating with the terminal by using the refreshed key; or after receiving the first key refresh instruction information sent by the first base station, sending, by the second base station, second key refresh instruction information to the terminal, and after receiving second feedback information that is returned by the terminal to notify that current key refresh has been completed, notifying the first base station that the terminal has completed the current key refresh;

where the second key refresh instruction information is used to instruct the terminal to refresh a key used for communication with the first base station and the key used for communication with the second base station.

In this embodiment of the present disclosure, the first key refresh instruction information includes: a PCI and frequency information of a target cell that are used for the current key refresh and a next hop NH value used for the current key refresh; or instruction information used to instruct to perform key refresh by using a PCI and frequency information of a current primary cell of the terminal, and an NH value used for the current key refresh.

With reference to the first aspect, the first possible implementation manner of the first aspect, the second possible implementation manner of the first aspect, the third possible implementation manner of the first aspect, or the fourth possible implementation manner of the first aspect, in an eighth possible implementation manner, if the first base station and the second base station generate, based on different security keys, respective keys used for communication with the terminal, the method further includes:

sending, by the second base station, first instruction information to the first base station after determining that local key refresh needs to be performed, where the first instruction information is used to instruct to temporarily stop forwarding data of the terminal to the second base station; or sending, by the second base station, first instruction information to the first base station after determining that local key-rekey needs to be performed, where the first instruction information is used to instruct to temporarily stop forwarding data of the terminal to the second base station.

With reference to the first aspect, the first possible implementation manner of the first aspect, the second possible implementation manner of the first aspect, the third possible implementation manner of the first aspect, or the fourth possible implementation manner of the first aspect, in a ninth possible implementation manner, if the first base station and the second base station generate, based on different security keys, respective keys used for communication with the terminal, the method further includes:

receiving, by the second base station, first instruction information sent by the first base station, where the first instruction information is used to instruct to temporarily stop data transmission related to the terminal; and temporarily stopping, by the second base station, data transmission related to the terminal, and after receiving an instruction that is sent by the first base station and that is used to instruct to resume data transmission related to the terminal, resuming data transmission related to the terminal.

With reference to the eighth possible implementation manner of the first aspect or the ninth possible implementation manner of the first aspect, in a tenth possible implementation manner, the method further includes:

after determining that local key refresh needs to be performed, sending, by the second base station, second key refresh instruction information to the terminal, and after receiving second feedback information that is returned by the terminal to notify that current key refresh has been completed, notifying the first base station to resume data transmission related to the terminal, where the second key refresh instruction information is used to instruct the terminal to refresh the key used for communication with the second base station; or after receiving the first instruction information sent by the first base station, sending, by the second base station, second key refresh instruction information to the terminal, and after receiving second feedback information that is returned by the terminal to notify that current key refresh has been completed, notifying the first base station that the terminal has completed the current key refresh, where the second key refresh instruction information is used to instruct the terminal to refresh a key used for communication with the first base station; or after determining that local key-rekey needs to be performed, sending, by the second base station, second key-rekey instruction information to the terminal, and after receiving second reply information that is returned by the terminal to notify that current key-rekey has been completed, notifying the first base station to resume data transmission related to the terminal, where the second key-rekey instruction information is used to instruct the terminal to update the key used for communication with the second base station; or after receiving the first instruction information sent by the first base station, sending, by the second base station, second key-rekey instruction information to the terminal, and after receiving second reply information that is returned by the terminal to notify that current key-rekey has been completed, notifying the first base station that the terminal has completed the current key-rekey, where the second key-rekey instruction information is used to instruct the terminal to update a key used for communication with the first base station.

In this embodiment of the present disclosure, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Preferably, the second key refresh instruction information further includes information about a cell that is specified by the first base station or the second base station for random access performed by the terminal.

With reference to the first aspect, the first possible implementation manner of the first aspect, the second possible implementation manner of the first aspect, the third possible implementation manner of the first aspect, or the fourth possible implementation manner of the first aspect, in an eleventh possible implementation manner, if the first base station and the second base station generate, based on a same security key, respective keys used for communication with the terminal, the method further includes:

receiving, by the second base station, first key-rekey instruction information sent by the first base station, where the first key-rekey instruction information carries a new security key that is acquired by the first base station from the MME;

updating, by the second base station according to the new security key, the key used for communication with the terminal; and after completing the current key-rekey, returning, by the second base station to the first base station, first reply information used to notify that the current key-rekey has been completed.

With reference to the eleventh possible implementation manner of the first aspect, in a twelfth possible implementation manner, the method further includes:

after receiving the first key-rekey instruction information sent by the first base station, sending, by the second base station, second key-rekey instruction information to the terminal, and after receiving second reply information that is returned by the terminal to notify that current key-rekey has been completed, notifying the first base station that the terminal has completed the current key-rekey, where the second key-rekey instruction information is used to instruct the terminal to update a key used for communication with the first base station and the key used for communication with the second base station.

With reference to the fifth possible implementation manner of the first aspect, the sixth possible implementation manner of the first aspect, the seventh possible implementation manner of the first aspect, the eighth possible implementation manner of the first aspect, the eleventh possible implementation manner of the first aspect, or the twelfth possible implementation manner of the first aspect, in a thirteenth possible implementation manner, the method further includes:

when determining that key refresh needs to be performed or receiving the first key refresh instruction information sent by the first base station, temporarily stopping, by the second base station, data transmission related to the terminal; and after determining that both the second base station and the terminal have completed local key refresh, resuming, by the second base station by using the refreshed key, data transmission related to the terminal; or when determining that key-rekey needs to be performed or receiving the first key-rekey instruction information sent by the first base station, temporarily stopping, by the second base station, data transmission related to the terminal; and after determining that both the second base station and the terminal have completed local key-rekey, resuming, by the second base station by using an updated key, data transmission related to the terminal.

According to a second aspect, a key processing method in dual connectivity mode is provided, where the method includes:

receiving, by a terminal that has a communication connection to a first base station and a communication connection to a second base station, second request information sent by the first base station or the second base station, where the second request information is used to request the terminal to generate a key used for communication with the second base station; and generating, by the terminal according to the second request information, the key used for communication with the second base station.

With reference to the second aspect, in a first possible implementation manner, the generating, by the terminal according to the second request information, the key used for communication with the second base station specifically includes:

generating, by the terminal according to a security algorithm used by the second base station and a first security key that is generated by the terminal for the first base station, the key used for communication with the second base station; or generating, by the terminal according to a security algorithm used by the second base station and a PCI and frequency information of a cell that are included in the second request information and that are used to generate a security key of the second base station, the key used for communication with the second base station; or generating, by the terminal, a second security key of the second base station according to stored security context information that is used to generate the second security key, and generating, according to the second security key, the key used for communication with the second base station.

With reference to the first possible implementation manner of the second aspect, in a second possible implementation manner, the generating, by the terminal, a second security key according to stored security context information that is used to generate the second security key of the second base station specifically includes:

receiving, by the terminal, an identifier, indicated by an MME, of the security context information that is used to generate the second security key, and generating the second security key according to the stored security context information corresponding to the identifier.

With reference to the second aspect or the first possible implementation manner of the second aspect, in a third possible implementation manner, if the second request information carries the PCI and the frequency information of the cell that are used to generate the security key of the second base station, the method further includes:

performing, by the terminal, random access in the cell corresponding to the PCI and the frequency information that are included in the second request information and that are used to generate the security key of the second base station, so as to access the second base station;

or performing, by the terminal, random access in a cell that is included in the second request information and that is specified by the first base station or the second base station for random access performed by the terminal, so as to access the second base station.

With reference to the second aspect or the first possible implementation manner of the second aspect, in a fourth possible implementation manner, the method further includes:

receiving, by the terminal, second key refresh instruction information sent by the first base station or the second base station, where the second key refresh instruction information is used to instruct the terminal to refresh a key used for communication with the first base station and/or the key used for communication with the second base station;

generating, by the second base station, a new security key according to information carried in the second key refresh instruction information, and generating, based on the new security key, a key used for communication with the first base station and/or a key used for communication with the second base station; and returning, by the terminal to the first base station or the second base station, second feedback information used to notify that current key refresh has been completed.

In this embodiment of the present disclosure, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Preferably, if the second key refresh instruction information further includes information about a cell that is specified by the first base station or the second base station for random access performed by the terminal, the terminal performs random access in the specified cell; or if the second key refresh instruction information instructs the terminal not to perform random access, the terminal does not perform random access.

With reference to the second aspect or the first possible implementation manner of the second aspect, in a fifth possible implementation manner, the method further includes:

receiving, by the terminal, second key-rekey instruction information sent by the first base station or the second base station, where the second key-rekey instruction information is used to instruct the terminal to update a key used for communication with the first base station and the key used for communication with the second base station;

generating, by the terminal, a new security key according to stored security context information, and generating, according to the new security key, a key used for communication with the first base station and a key used for communication with the second base station; and returning, by the terminal to the first base station or the second base station, second reply information used to notify that current key-rekey has been completed.

According to a third aspect, a base station is provided, where the base station includes:

a receiving module, configured to receive first request information sent by a first base station, where the first request information is used to request the base station to generate a key used for communication with the terminal; and a processing module, configured to generate, based on a security key carried in the first request information, the key used for communication with the terminal, where the base station and the first base station each have a communication connection to the terminal.

With reference to the third aspect, in a first possible implementation manner, the processing module is specifically configured to:

generate, according to a first security key that is carried in the first request information and that is currently used by the first base station, the key used for communication with the terminal; or generate, according to a first security key that is carried in the first request information and that is currently used by the first base station, a security key different from the first security key, and generate, according to the generated security key, the key used for communication with the terminal.

With reference to the first possible implementation manner of the third aspect, in a second possible implementation manner, the generating, by the processing module, a security key different from the first security key specifically includes:

determining a physical cell identifier PCI and frequency information of at least one cell covered by the second base station, and generating, according to the PCI and the frequency information of the cell that are determined and the first security key, the security key different from the first security key.

With reference to the third aspect, in a third possible implementation manner, the processing module is specifically configured to:

generate, according to a second security key that is carried in the first request information and that is generated by an MME for the base station, the key used for communication with the terminal.

With reference to the third aspect, the first possible implementation manner of the third aspect, the second possible implementation manner of the third aspect, or the third possible implementation manner of the third aspect, in a fourth possible implementation manner, the processing module is further configured to:

after the receiving module receives the first request information sent by the first base station, send second request information to the terminal, where the second request information is used to request the terminal to generate a key used for communication with the base station.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, if the first base station and the base station generate, based on a same security key, respective keys used for communication with the terminal:

the receiving module is further configured to receive first key refresh instruction information sent by the first base station, where the first key refresh instruction information is used to instruct the base station to refresh the key used for communication with the terminal; and the processing module is further configured to generate a new security key according to information carried in the first key refresh instruction information, and generate, according to the new security key, a key used for communication with the terminal.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, if the first base station and the base station generate, based on a same security key, respective keys used for communication with the terminal, the processing module is further configured to:

after it is determined that key refresh needs to be performed, send first key refresh instruction information to the first base station, where the first key refresh instruction information is used to instruct the first base station to refresh the key used for communication with the terminal; and after first feedback information that is returned by the first base station to notify that current key refresh has been completed is received and the base station completes local key refresh, communicate with the terminal by using a refreshed key.

With reference to the fifth possible implementation manner of the third aspect, or with reference to the sixth possible implementation manner of the third aspect, in a seventh possible implementation manner, the processing module is further configured to:
  after it is determined that key refresh needs to be performed, send second key refresh instruction information to the terminal, and after second feedback information that is returned by the terminal to notify that current key refresh has been completed is received, communicate with the terminal by using the refreshed key; or
  after the first key refresh instruction information sent by the first base station is received, send second key refresh instruction information to the terminal, and after second feedback information that is returned by the terminal to notify that current key refresh has been completed is received, notify the first base station that the terminal has completed the current key refresh;
  where the second key refresh instruction information is used to instruct the terminal to refresh a key used for communication with the first base station and the key used for communication with the base station.

With reference to the third aspect, the first possible implementation manner of the third aspect, the second possible implementation manner of the third aspect, the third possible implementation manner of the third aspect, or the fourth possible implementation manner of the third aspect, in an eighth possible implementation manner, if the first base station and the base station generate, based on different security keys, respective keys used for communication with the terminal, the processing module is further configured to:
  send first instruction information to the first base station after it is determined that local key refresh needs to be performed, where the first instruction information is used to instruct to temporarily stop forwarding data of the terminal to the base station; or
  send first instruction information to the first base station after it is determined that local key-rekey needs to be performed, where the first instruction information is used to instruct to temporarily stop forwarding data of the terminal to the base station.

With reference to the third aspect, the first possible implementation manner of the third aspect, the second possible implementation manner of the third aspect, the third possible implementation manner of the third aspect, or the fourth possible implementation manner of the third aspect, in a ninth possible implementation manner, if the first base station and the base station generate, based on different security keys, respective keys used for communication with the terminal:
  the receiving module is further configured to receive first instruction information sent by the first base station, where the first instruction information is used to instruct to temporarily stop data transmission related to the terminal; and
  the processing module is further configured to temporarily stop data transmission related to the terminal, and after the receiving module receives an instruction that is sent by the first base station and that is used to instruct to resume data transmission related to the terminal, resume data transmission related to the terminal.

With reference to the eighth possible implementation manner of the third aspect, or the ninth possible implementation manner of the third aspect, in a tenth possible implementation manner, the processing module is further configured to:
  after it is determined that local key refresh needs to be performed, send second key refresh instruction information to the terminal, and after second feedback information that is returned by the terminal to notify that current key refresh has been completed is received, notify the first base station to resume data transmission related to the terminal, where the second key refresh instruction information is used to instruct the terminal to refresh the key used for communication with the base station; or
  after the receiving module receives the first instruction information sent by the first base station, send second key refresh instruction information to the terminal, and after second feedback information that is returned by the terminal to notify that current key refresh has been completed is received, notify the first base station that the terminal has completed the current key refresh, where the second key refresh instruction information is used to instruct the terminal to refresh a key used for communication with the first base station; or
  after it is determined that local key-rekey needs to be performed, send second key-rekey instruction information to the terminal, and after second reply information that is returned by the terminal to notify that current key-rekey has been completed is received, notify the first base station to resume data transmission related to the terminal, where the second key-rekey instruction information is used to instruct the terminal to update the key used for communication with the base station; or
  after the receiving module receives the first instruction information sent by the first base station, send second key-rekey instruction information to the terminal, and after second reply information that is returned by the terminal to notify that current key-rekey has been completed is received, notify the first base station that the terminal has completed the current key-rekey, where the second key-rekey instruction information is used to instruct the terminal to update a key used for communication with the first base station.

With reference to the third aspect, the first possible implementation manner of the third aspect, the second possible implementation manner of the third aspect, the third possible implementation manner of the third aspect, or the fourth possible implementation manner of the third aspect, in an eleventh possible implementation manner, if the first base station and the base station generate, based on a same security key, respective keys used for communication with the terminal:
  the receiving module is further configured to: receive first key-rekey instruction information sent by the first base station, where the first key-rekey instruction information carries a new security key that is acquired by the first base station from the MME; and
  the processing module is further configured to: update, according to the new security key, the key used for communication with the terminal; and after completing the current key-rekey, return, to the first base station, first reply information used to notify that the current key-rekey has been completed.

With reference to the eleventh possible implementation manner of the third aspect, in a twelfth possible implementation manner, the processing module is further configured to:

after the receiving module receives the first key-rekey instruction information sent by the first base station, send second key-rekey instruction information to the terminal, and after second reply information that is returned by the terminal to notify that current key-rekey has been completed is received, notify the first base station that the terminal has completed the current key-rekey, where the second key-rekey instruction information is used to instruct the terminal to update a key used for communication with the first base station and the key used for communication with the base station.

With reference to the fifth possible implementation manner of the third aspect, the sixth possible implementation manner of the third aspect, the seventh possible implementation manner of the third aspect, the eighth possible implementation manner of the third aspect, the eleventh possible implementation manner of the third aspect, or the twelfth possible implementation manner of the third aspect, in a thirteenth possible implementation manner, the processing module is further configured to:

when it is determined that key refresh needs to be performed or the first key refresh instruction information sent by the first base station is received, temporarily stop data transmission related to the terminal; and after it is determined that both the base station and the terminal have completed local key refresh, resume, by using the refreshed key, data transmission related to the terminal;

or when it is determined that key-rekey needs to be performed or the first key-rekey instruction information sent by the first base station is received, temporarily stop data transmission related to the terminal; and after it is determined that both the base station and the terminal have completed local key-rekey, resume, by using an updated key, data transmission related to the terminal.

According to a fourth aspect, a terminal is provided, where the terminal has a communication connection to a first base station and a communication connection to a second base station, including:

a receiving module, configured to receive second request information sent by the first base station or the second base station, where the second request information is used to request the terminal to generate a key used for communication with the second base station; and a processing module, configured to generate, according to the second request information, the key used for communication with the second base station.

With reference to the fourth aspect, in a first possible implementation manner, the processing module is specifically configured to:

generate, according to a security algorithm used by the second base station and a first security key that is generated by the terminal for the first base station, the key used for communication with the second base station; or generate, according to a security algorithm used by the second base station and a PCI and frequency information of a cell that are included in the second request information and that are used to generate a security key of the second base station, the key used for communication with the second base station; or generate a second security key of the second base station according to stored security context information that is used to generate the second security key, and generate, according to the second security key, the key used for communication with the second base station.

With reference to the first possible implementation manner of the fourth aspect, in a second possible implementation manner, the receiving module is further configured to: receive an identifier, indicated by an MME, of the security context information that is used to generate the second security key; and the processing module is specifically configured to: generate the second security key according to the stored security context information corresponding to the identifier.

With reference to the fourth aspect or the first possible implementation manner of the fourth aspect, in a third possible implementation manner, if the second request information carries the PCI and the frequency information of the cell that are used to generate the security key of the second base station, the processing module is further configured to:

perform random access in the cell corresponding to the PCI and the frequency information that are included in the second request information and that are used to generate the security key of the second base station, so as to access the second base station; or perform random access in a cell that is included in the second request information and that is specified by the first base station or the second base station for random access performed by the terminal, so as to access the second base station.

With reference to the fourth aspect or the first possible implementation manner of the fourth aspect, in a fourth possible implementation manner, the receiving module is further configured to: receive second key refresh instruction information sent by the first base station or the second base station, where the second key refresh instruction information is used to instruct the terminal to refresh a key used for communication with the first base station and/or the key used for communication with the second base station; and the processing module is further configured to: generate a new security key according to information carried in the second key refresh instruction information, and generate, based on the new security key, a key used for communication with the first base station and/or a key used for communication with the second base station; and return, to the first base station or the second base station, second feedback information used to notify that current key refresh has been completed.

With reference to the fourth aspect or the first possible implementation manner of the fourth aspect, in a fifth possible implementation manner, the receiving module is further configured to: receive second key-rekey instruction information sent by the first base station or the second base station, where the second key-rekey instruction information is used to instruct the terminal to update a key used for communication with the first base station and the key used for communication with the second base station; and the processing module is further configured to: generate a new security key according to stored security context information, and generate, according to the new security key, a key used for communication with the first base station and a key used for communication with the second base station; and return, to the first base station or the second base station, second reply information used to notify that current key-rekey has been completed.

According to a fifth aspect, another base station is provided, where the base station includes:
a transceiver, configured to receive first request information sent by a first base station, where the first request information is used to request the base station to generate a key used for communication with the terminal; and
a processor, configured to generate, based on a security key carried in the first request information, the key used for communication with the terminal,
where the base station and the first base station each have a communication connection to the terminal.

With reference to the fifth aspect, in a first possible implementation manner, the processor is specifically configured to:
generate, according to a first security key that is carried in the first request information and that is currently used by the first base station, the key used for communication with the terminal; or
generate, according to a first security key that is carried in the first request information and that is currently used by the first base station, a security key different from the first security key, and generate, according to the generated security key, the key used for communication with the terminal.

With reference to the first possible implementation manner of the fifth aspect, in a second possible implementation manner, the generating, by the processor, a security key different from the first security key specifically includes:
determining a physical cell identifier PCI and frequency information of at least one cell covered by the second base station, and generating, according to the PCI and the frequency information of the cell that are determined and the first security key, the security key different from the first security key.

With reference to the fifth aspect, in a third possible implementation manner, the processor is specifically configured to:
generate, according to a second security key that is carried in the first request information and that is generated by an MME for the base station, the key used for communication with the terminal.

With reference to the fifth aspect, the first possible implementation manner of the fifth aspect, the second possible implementation manner of the fifth aspect, or the third possible implementation manner of the fifth aspect, in a fourth possible implementation manner, the transceiver is further configured to:
after receiving the first request information sent by the first base station, send second request information to the terminal, where the second request information is used to request the terminal to generate a key used for communication with the base station.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a fifth possible implementation manner, if the first base station and the base station generate, based on a same security key, respective keys used for communication with the terminal:
the transceiver is further configured to receive first key refresh instruction information sent by the first base station, where the first key refresh instruction information is used to instruct the base station to refresh the key used for communication with the terminal; and
the processor is further configured to generate a new security key according to information carried in the first key refresh instruction information, and generate, according to the new security key, a key used for communication with the terminal.

With reference to the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, in a sixth possible implementation manner, if the first base station and the base station generate, based on a same security key, respective keys used for communication with the terminal, the processor is further configured to:
after it is determined that key refresh needs to be performed, trigger the transceiver to send first key refresh instruction information to the first base station, where the first key refresh instruction information is used to instruct the first base station to refresh the key used for communication with the terminal; and after the transceiver receives first feedback information that is returned by the first base station to notify that current key refresh has been completed and the base station completes local key refresh, communicate with the terminal by using a refreshed key.

With reference to the fifth possible implementation manner of the fifth aspect or with reference to the sixth possible implementation manner of the fifth aspect, in a seventh possible implementation manner,
the processor is further configured to: after it is determined that key refresh needs to be performed, trigger the transceiver to send second key refresh instruction information to the terminal, and after the transceiver receives second feedback information that is returned by the terminal to notify that current key refresh has been completed, communicate with the terminal by using the refreshed key;
or
the transceiver is further configured to: after receiving the first key refresh instruction information sent by the first base station, send second key refresh instruction information to the terminal, and after receiving second feedback information that is returned by the terminal to notify that current key refresh has been completed, notify the first base station that the terminal has completed the current key refresh;
where the second key refresh instruction information is used to instruct the terminal to refresh a key used for communication with the first base station and the key used for communication with the base station.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in an eighth possible implementation manner, if the first base station and the base station generate, based on different security keys, respective keys used for communication with the terminal, the transceiver is further configured to:
after the processor determines that local key refresh needs to be performed, send first instruction information to the first base station, where the first instruction information is used to instruct to temporarily stop forwarding data of the terminal to the base station; or after the processor determines that local key-rekey needs to be performed, send first instruction information to the first base station, where the first instruction information is used to instruct to temporarily stop forwarding data of the terminal to the base station.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a ninth possible implementation manner, if the first base station and the base station generate, based on different security keys, respective keys used for communication with the terminal:
- the transceiver is further configured to receive first instruction information sent by the first base station, where the first instruction information is used to instruct to temporarily stop data transmission related to the terminal; and
- the processor is further configured to temporarily stop data transmission related to the terminal, and after the transceiver receives an instruction that is sent by the first base station and that is used to instruct to resume data transmission related to the terminal, resume data transmission related to the terminal.

With reference to the eighth possible implementation manner of the fifth aspect or the ninth possible implementation manner of the fifth aspect, in a tenth possible implementation manner, the transceiver is further configured to:
- after the processor determines that local key refresh needs to be performed, send second key refresh instruction information to the terminal, and after second feedback information that is returned by the terminal to notify that current key refresh has been completed, notify the first base station to resume data transmission related to the terminal, where the second key refresh instruction information is used to instruct the terminal to refresh the key used for communication with the base station; or
- after receiving the first instruction information sent by the first base station, send second key refresh instruction information to the terminal, and after receiving second feedback information that is returned by the terminal to notify that current key refresh has been completed, notify the first base station that the terminal has completed the current key refresh, where the second key refresh instruction information is used to instruct the terminal to refresh a key used for communication with the first base station; or
- after the processor determines that local key-rekey needs to be performed, send second key-rekey instruction information to the terminal, and after receiving second reply information that is returned by the terminal to notify that current key-rekey has been completed, notify the first base station to resume data transmission related to the terminal, where the second key-rekey instruction information is used to instruct the terminal to update the key used for communication with the base station; or
- after receiving the first instruction information sent by the first base station, send second key-rekey instruction information to the terminal, and after receiving second reply information that is returned by the terminal to notify that current key-rekey has been completed, notify the first base station that the terminal has completed the current key-rekey, where the second key-rekey instruction information is used to instruct the terminal to update a key used for communication with the first base station.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in an eleventh possible implementation manner, if the first base station and the base station generate, based on a same security key, respective keys used for communication with the terminal:
- the transceiver is further configured to: receive first key-rekey instruction information sent by the first base station, where the first key-rekey instruction information carries a new security key that is acquired by the first base station from the MME; and
- the processor is further configured to: update, according to the new security key, the key used for communication with the terminal; and after completing the current key-rekey, trigger the transceiver to return, to the first base station, first reply information used to notify that the current key-rekey has been completed.

With reference to the eleventh possible implementation manner of the fifth aspect, in a twelfth possible implementation manner, the transceiver is further configured to:
- after receiving the first key-rekey instruction information sent by the first base station, send second key-rekey instruction information to the terminal, and after receiving second reply information that is returned by the terminal to notify that current key-rekey has been completed, notify the first base station that the terminal has completed the current key-rekey, where the second key-rekey instruction information is used to instruct the terminal to update a key used for communication with the first base station and the key used for communication with the base station.

With reference to the fifth possible implementation manner of the fifth aspect, the sixth possible implementation manner of the fifth aspect, the seventh possible implementation manner of the fifth aspect, the eighth possible implementation manner of the fifth aspect, the eleventh possible implementation manner of the fifth aspect, or the twelfth possible implementation manner of the fifth aspect, in a thirteenth possible implementation manner, the processor is further configured to:
- when it is determined that key refresh needs to be performed or the first key refresh instruction information sent by the first base station is received, temporarily stop data transmission related to the terminal; and after it is determined that both the base station and the terminal have completed local key refresh, resume, by using the refreshed key, data transmission related to the terminal;
- or
- when it is determined that key-rekey needs to be performed or the first key-rekey instruction information sent by the first base station is received, temporarily stop data transmission related to the terminal; and after it is determined that both the base station and the terminal have completed local key-rekey, resume, by using an updated key, data transmission related to the terminal.

According to a sixth aspect, another terminal is provided, where the terminal has a communication connection to a first base station and a communication connection to a second base station, including:

a transceiver, configured to receive second request information sent by the first base station or the second base station, where the second request information is used to request the terminal to generate a key used for communication with the second base station; and a processor, configured to generate, according to the second request information, the key used for communication with the second base station.

With reference to the sixth aspect, in a first possible implementation manner, the processor is specifically configured to:

generate, according to a security algorithm used by the second base station and a first security key that is generated by the terminal for the first base station, the key used for communication with the second base station; or generate, according to a security algorithm used by the second base station and a PCI and frequency information of a cell that are included in the second request information and that are used to generate a security key of the second base station, the key used for communication with the second base station; or generate a second security key of the second base station according to stored security context information that is used to generate the second security key, and generate, according to the second security key, the key used for communication with the second base station.

With reference to the first possible implementation manner of the sixth aspect, in a second possible implementation manner, the transceiver is further configured to: receive an identifier, indicated by an MME, of the security context information that is used to generate the second security key; and the processor is further configured to: generate the second security key according to the stored security context information corresponding to the identifier.

With reference to the sixth aspect or the first possible implementation manner of the sixth aspect, in a third possible implementation manner, if the second request information carries the PCI and the frequency information of the cell that are used to generate the security key of the second base station, the processor is further configured to:

perform random access in the cell corresponding to the PCI and the frequency information that are included in the second request information and that are used to generate the security key of the second base station, so as to access the second base station; or perform random access in a cell that is included in the second request information and that is specified by the first base station or the second base station for random access performed by the terminal, so as to access the second base station.

With reference to the sixth aspect, or the first possible implementation manner of the sixth aspect, in a fourth possible implementation manner, the transceiver is further configured to: receive second key refresh instruction information sent by the first base station or the second base station, where the second key refresh instruction information is used to instruct the terminal to refresh a key used for communication with the first base station and/or the key used for communication with the second base station; and the processor is further configured to: generate a new security key according to information carried in the second key refresh instruction information, and generate, based on the new security key, a key used for communication with the first base station and/or a key used for communication with the second base station; and trigger the transceiver to return, to the first base station or the second base station, second feedback information used to notify that current key refresh has been completed.

With reference to the sixth aspect, or the first possible implementation manner of the sixth aspect, in a fifth possible implementation manner, the transceiver is further configured to: receive second key-rekey instruction information sent by the first base station or the second base station, where the second key-rekey instruction information is used to instruct the terminal to update a key used for communication with the first base station and the key used for communication with the second base station; and the processor is further configured to: generate a new security key according to stored security context information, and generate, according to the new security key, a key used for communication with the first base station and a key used for communication with the second base station; and trigger the transceiver to return, to the first base station or the second base station, second reply information used to notify that current key-rekey has been completed.

BRIEF DESCRIPTION OF DRAWINGS

FIG. 4 is a schematic diagram of a key processing method on a base station side according to an embodiment of the present disclosure;

FIG. 5 is a schematic diagram of a key processing method on a terminal side according to an embodiment of the present disclosure;

DESCRIPTION OF EMBODIMENTS

Figure 1:
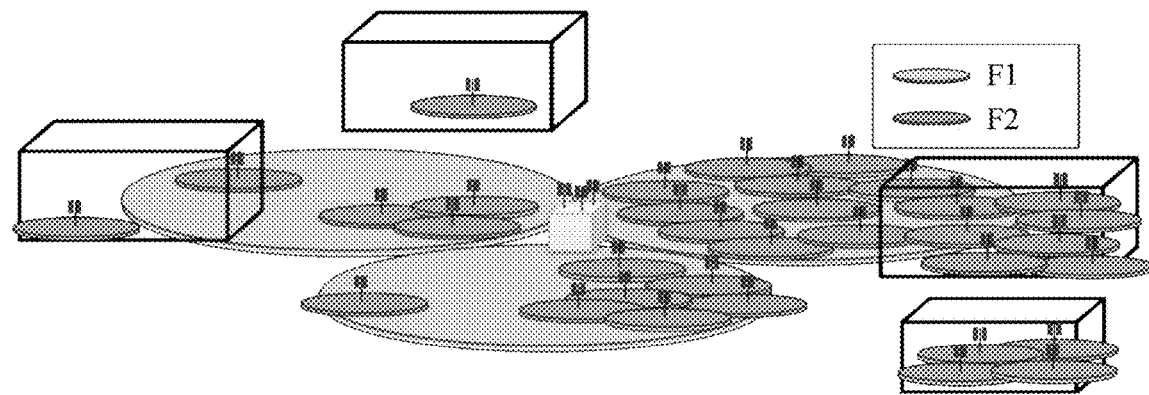
FIG. 1 is a schematic diagram of small cell enhancements in the prior art.
Figure 2A:
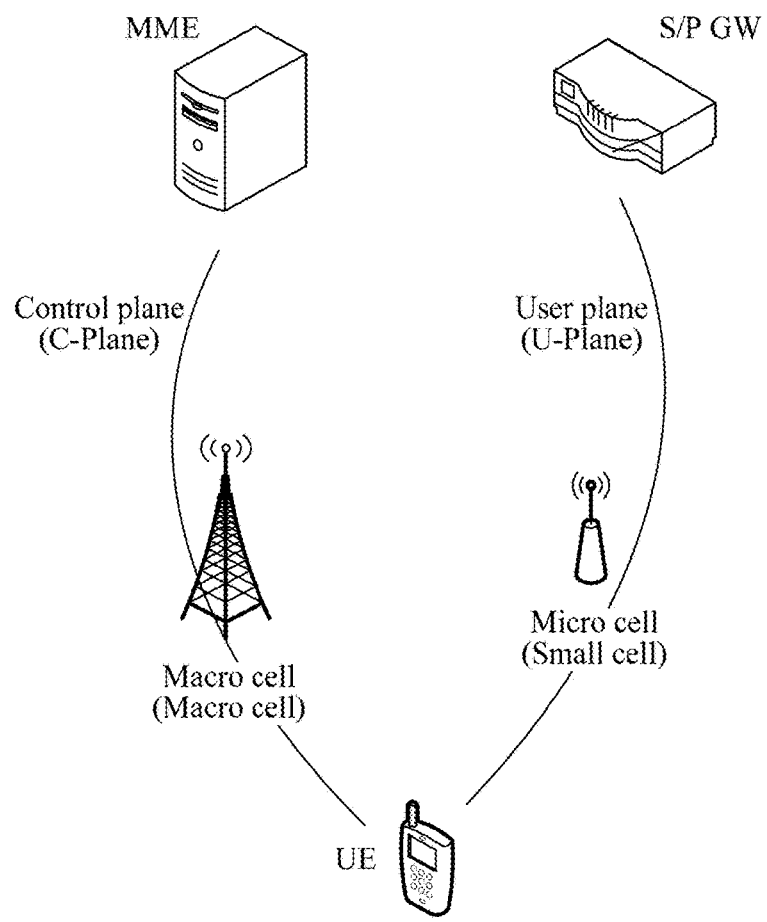
FIG. 2A is a schematic diagram of a first dual connectivity mode in the prior art.
Figure 2B:
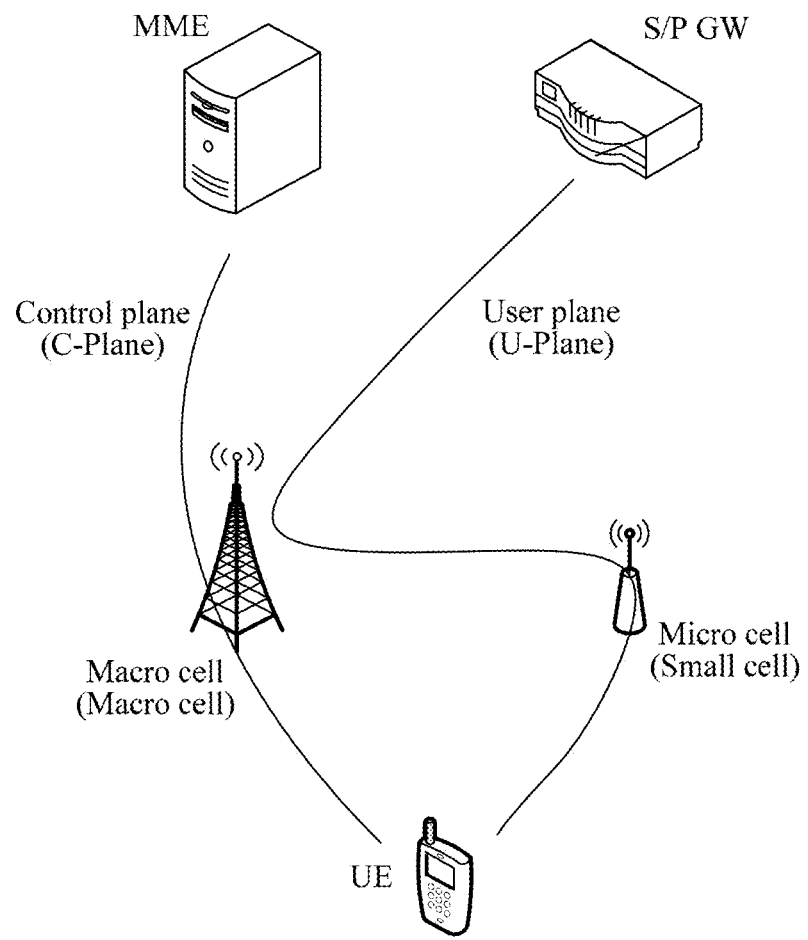
FIG. 2B is a schematic diagram of a second dual connectivity mode in the prior art.
Figure 3:
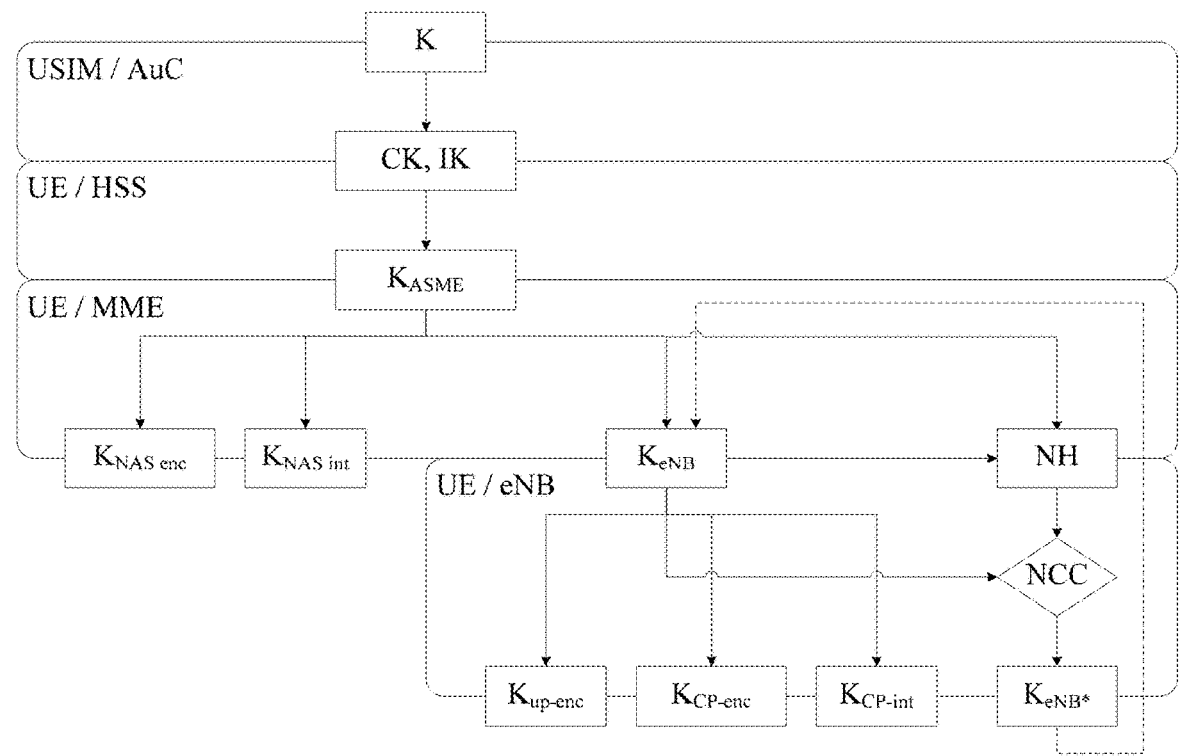
FIG. 3 is a schematic diagram of generating a key in the prior art.

Embodiments of the present disclosure provide a key processing method for a terminal working in dual connectivity mode, which includes specific implementation solutions of generating an initial key, key refresh, and key-rekey, and ensures communication security of the terminal in dual connectivity mode.

The following further describes the embodiments of the present disclosure in detail with reference to accompanying drawings in this specification.

Referring to FIG. 4, an embodiment of the present disclosure provides a key processing method in dual connectivity mode, where the method includes the following steps:

S41: Of a first base station and a second base station that have a communication connection to a terminal each, the second base station receives first request information sent by the first base station, where the first request information is used to request the second base station to generate a key used for communication with the terminal.

The first request information carries a security key, so that the second base station can generate, according to the security key, the key used for communication with the terminal.

Further, the security key carried in the first request information may be a first security key currently used by the first base station, or may be a second security key that is generated by a mobility management entity (MME) for the second base station. The first security key currently used by the first base station may be a first security key (that is, $K_{eNB}$) generated by the MME for the first base station, that is an initial first security key; or may be a first security key that has been refreshed or updated by the first base station, that is, the first base station refreshes (or updates) the currently used first security key after determining that a key refresh trigger condition (or a key-rekey trigger condition) is satisfied.

In this embodiment of the present disclosure, the MME and the terminal each store at least one set of security context information for generating a security key, and the MME (or the terminal) may generate a different security key based on each set of security context information stored in the MME (or the terminal), where the MME and the terminal store the same security context information.

Each set of security context information includes at least a K parameter, a CK parameter, and an IK parameter.

In this embodiment of the present disclosure, if the MME and the terminal each store at least two sets of security context information for generating a security key, to ensure that the MME and the terminal use same security context information to generate the first security key of the first base station, the second security key of the second base station, or a security of the first base station and the second base station (that is, the first base station and the second base station use a same security key), preferably, the MME indicates, to the terminal, an identifier (such as a number of the security context information) for generating the first security key of the first base station, or the second security key of the second base station, or the security key of the first base station and the second base station. The present disclosure is not limited to the foregoing method, and any method that can ensure that the MME and the terminal generate a same first security key and a same second security key is applicable to the present disclosure.

S42: The second base station generates, based on a security key carried in the first request information, the key used for communication with the terminal.

In this embodiment of the present disclosure, the second base station receives first request information sent by the first base station, where the first request information is used to request the second base station to generate a key used for communication with the terminal; and the second base station generates, based on a security key carried in the first request information, the key used for communication with the terminal. In this way, the second base station can generate the key used for communication with the terminal, thereby ensuring communication security of the terminal in dual connectivity mode.

In this embodiment of the present disclosure, a key used by a base station (including the first base station and the second base station) for communication with the terminal includes but is not limited to one of or a combination of the following keys:

a cipher key for a control-plane message, an integrity protection key for a control-plane message, and a cipher key for user-plane data.

In this embodiment of the present disclosure, the foregoing process of generating an initial key by the second base station is triggered by a primary base station of the terminal (for example, a base station to which a macro cell belongs, or a base station to which a primary cell belongs), that is, in the foregoing step S41 and step S42, the first base station is the primary base station of the terminal, and the second base station is a secondary base station of the terminal (for example, a base station to which a small cell belongs or a base station to which a secondary cell belongs).

In step S41, as a implementation manner, the first request information sent by the first base station to the second base station may be a SeNB adding request message, where the SeNB adding request message is used to request the second base station to share load of the first base station, and the SeNB adding request message carries a security key.

Specifically, a trigger condition of the SeNB adding request message sent by the first base station to the second base station is: The first base station offloads, based on an offloading requirement of the first base station, some services or some data to the second base station for transmission, and therefore, needs to send the SeNB adding request message to the second base station, so as to request the second base station to share load of the first base station. Further, the SeNB adding request message may include related information about a service or data that needs to be offloaded to the second base station.

Based on the foregoing implementation manner, correspondingly, in step S42, after receiving the SeNB adding request message sent by the first base station, the second base station determines whether the second base station is allowed to share load of the first base station, and when it is determined that the second base station is allowed to share load of the first base station, the second base station generates, according to the security key carried in the SeNB adding request message, the key used for communication with the terminal, and then returns a SeNB adding confirm message to the first base station.

Specifically, this embodiment of the present disclosure does not limit an execution sequence of the foregoing two processes. After receiving the SeNB adding request message sent by the first base station, the second base station may first determine whether the second base station is allowed to share load of the first base station, and then generate, according to the security key carried in the SeNB adding request message, the key used for communication with the terminal; or after receiving the SeNB adding request message sent by the first base station, the second base station may first generate, according to the security key carried in the SeNB adding request message, the key used for communication with the terminal, and then determine whether the second base station is allowed to share load of the first base station.

Further, if the second base station determines that the second base station is allowed to share load of the first base station, the SeNB adding confirm message carries an indication used to indicate that the second base station is allowed to share load of the first base station, or carries information of a SCell (such as identification information of the cell and/or frequency information of the cell), where the SCell can share load of the first base station; preferably, the SeNB adding confirm message further carries identification information of a security algorithm used by the second base station and/or information about at least one cell (such as identification information of the cell and/or frequency information of the cell), where the at least one cell is covered by the second base station and is determined by the second base station for the terminal; or if the second base station determines that the second base station is not allowed to share load of the first base station, the SeNB adding confirm message carries an indication used to indicate that the second base station is not allowed to share load of the first base station.

In the foregoing embodiment, an existing SeNB adding request message may be used as the first request information received by the second base station, so that the second base station can generate, when the first base station performs offloading configuration, the key used for communication with the terminal, thereby reducing system signaling overheads. Certainly, another existing message or new signaling, such as a SCell adding request message, may also be used as the first request information, and this embodiment of the present disclosure does not limit an implantation manner of the first request information.

In implementation, step S42 specifically includes the following implementation manners:

Manner 1: If the security key carried in the first request information is a first security key currently used by the first base station, the second base station generates, according to the first security key that is carried in the first request information and that is currently used by the first base station, the key used for communication with the terminal.

The first security key currently used by the first base station may be an initial first security key that is generated by the MME for the first base station, or a first security key that has been refreshed by the first base station, or a first security key that has been updated by the first base station.

Specifically, the second base station generates, according to the first security key that is carried in the first request information and that is currently used by the first base station and a security algorithm of the second base station, the key used for communication with the terminal.

In this manner, the first base station and the second base station use a same security key to generate respective keys used for communication with the same terminal.

Manner 2: If the security key carried in the first request information is a first security key currently used by the first base station, the second base station generates, according to the first security key that is carried in the first request information and that is currently used by the first base station, a security key different from the first security key, and generates, according to the generated security key, the key used for communication with the terminal.

The first security key currently used by the first base station may be an initial first security key that is generated by the MME for the first base station, or a first security key that has been refreshed by the first base station, or a first security key that has been updated by the first base station.

Specifically, the second base station first generates, based on the first security key that is currently used by the first base station, a security key different from the first security key that is currently used by the first base station, and then generates, according to the generated security key and a security algorithm of the second base station, the key used for communication with the terminal.

In this manner, the generating, by the second base station, a security key different from the first security key specifically includes:

determining, by the second base station, a physical cell identifier (Physical Cell Identity, PCI) and frequency information of at least one cell of the second base station, and generating, according to the PCI and the frequency information of the cell that are determined, the security key different from the first security key that is currently used by the first base station, where the cell of the second base station determined by the second base station refers to a cell managed and controlled by the second base station (or referred to as a cell related to the second base station).

In this manner, the second base station generates, by using a security key different from that of the first base station, the key used for communication with the same terminal.

In both the manner 1 and manner 2 above, the first request information carries the first security key currently used by the first base station, and the first base station and the second base station may agree, in advance, on whether to use a same security key to generate respective keys used for communication with the terminal; or it may be stipulated in a protocol whether the first base station and the second base station use a same security key to generate respective keys used for communication with the terminal; or the first request information may carry indication information, to indicate whether the second base station use a same security key as the first base station to generate the key used for communication with the terminal.

Manner 3: If the security key carried in the first request information is a second security key that is generated by the MME for the second base station, the second base station generates, according to the second security key that is carried in the first request information, the key used for communication with the terminal.

In this manner, before sending the first request information, the first base station first acquires, from the MME, the second security key that is generated by the MME for the second base station.

In this manner, the MME stores at least two sets of security context information, and separately generates two different security keys that are used as the first security key of the first base station and the second security key of the second base station respectively; and correspondingly, the terminal also stores at least two sets of security context information, and separately generates two different security keys that are respectively used as a first security key that is used to generate a key used for communication with the first base station and a second security key that is used to generate a key used for communication with the second base station.

The first security keys generated by the MME and the terminal are the same, and the second security keys generated by the MME and the terminal are the same, that is, the MME and the terminal generate the first security keys based on same security context information, and the MME and the terminal generate the second security keys based on same security context information.

To ensure that the MME and the terminal generate the same first security key and the same second security key, it may be stipulated in a protocol that the first security key and the second security key are generated by sequentially using security context information according to a sequence of numbers of stored security context information; or the MME and the terminal may agree on security context information used to generate the first security key and security context information used to generate the second security key; or the MME may notify the terminal of a number of security context information that is used by the MME to generate the first security key and a number of security context information that is used by the MME to generate the second security number; and the like, as long as it can be ensured that the MME and the terminal generate the same first security key and the same second security key.

In this manner, the first base station generates, by using the first security key that is currently used by the first base station, a key used for communication with the terminal, and the second base station generates, by using the second security key that is generated by the MME for the second base station, a key for communication with the same terminal.

In implementation, the key processing method provided by this embodiment of the present disclosure further includes: triggering the terminal to generate a key used for communication with the second base station, which specifically includes the following two implementation methods:

Method 1: The second base station triggers the terminal to generate the key used for communication with the second base station, which is specifically as follows:

After receiving the first request information sent by the first base station, the second base station sends second request information to the terminal, so as to request the terminal to generate the key used for communication with the second base station, where the second request information carries identification information of a security algorithm used by the second base station.

In this method, when receiving the first request information sent by the first base station, the second base station may first send the second request information to the terminal, and then generate, according to the security key carried in the first request information, the key used for communication with the terminal; or when receiving the first request information sent by the first base station, the second base station may first generate, according to the security key carried in the first request information, the key used for communication with the terminal, and then send the second request information to the terminal; this embodiment of the present disclosure does not limit a sending moment at which the second base station sends the second request information.

Method 2: The first base station triggers the terminal to generate the key used for communication with the second base station, which is specifically as follows:

The first base station sends second request information to the terminal, so as to request the terminal to generate the key used for communication with the second base station, where the second request information carries identification information of a security algorithm used by the second base station.

In this method, before sending the first request information to the second base station, the first base station may first send the second request information to the terminal, or may send the second request information to the terminal after sending the first request information to the second base station, or may send the first request information to the second base station and send the second request information to the terminal at the same time; this embodiment of the present disclosure does not limit a sending moment at which the first base station sends the second request information.

Further, based on the foregoing method 1 and method 2, if the second base station uses the foregoing manner 2 to generate the key used for communication with the terminal, preferably, the second request information may further include a PCI and frequency information of a cell that are used to generate the second security key of the second base station, so that the terminal can generate, according to the PCI and the frequency information of the cell and the security algorithm of the second base station, the key used for communication with the second base station, and therefore, the terminal and the second base station communicate with each other by using a same key.

Further, based on the foregoing method 1 and method 2, if the second base station uses the foregoing manner 3 to generate the key used for communication with the terminal, preferably, the second request information further includes instruction information used to instruct the terminal to generate the second security key for the second base station, so that the terminal can generate the second security key of the second base station according to security context information that is stored by the terminal and that is used to generate the second security key, and generate, according to the generated second security key, the key used for communication with the second base station, and therefore, the terminal and the second base station communicate with each other by using a same key.

Preferably, the second request information further includes information about a cell (such as an identification information of the cell and/or frequency information of the cell) of the second base station, where the cell is specified by the first base station or the second base station for the terminal and that can be randomly accessed, so that when the terminal needs to access the second base station, the terminal can perform a random access process in the cell that is specified in the second request information, so as to access the second base station.

Based on the foregoing method 1 and method 2, for a processing process on the terminal, refer to subsequent descriptions related to a terminal side.

In implementation, if the first base station triggers the terminal to generate the key used for communication with the second base station, the first base station sends second request information to the terminal, and as a implementation manner, the second request information may be a radio resource control (RRC) connection reconfiguration message.

In this implementation manner, because an existing RRC reconfiguration message may be used as the second request information, system signaling overheads are reduced. Certainly, another existing message or new signaling may also be used as the second request information, and this embodiment of the present disclosure does not limit an implantation manner of the second request information.

After the foregoing process of generating an initial key is completed, in a process of communicating with the first base station and the second base station, the terminal may further perform key refresh and key-rekey. A key refresh process and a key-rekey process are described in detail below.

I. Key Refresh:

In this embodiment of the present disclosure, the key refresh process may be triggered by a primary base station of the terminal (for example, a base station to which a macro cell belongs or a base station to which a primary cell belongs), or may be triggered by a secondary base station (for example, a base station to which a small cell belongs or a base station to which a secondary cell belongs), that is, the first base station involved in the key refresh process may be the primary base station of the terminal (in this case, the second base station is the secondary base station of the terminal), or the first base station may be the secondary base station of the terminal (in this case, the second base station is the primary base station of the terminal).

In implementation, the key refresh provided in this embodiment of the present disclosure specifically includes the following to cases:

Case 1: In the foregoing key generation process, if the second base station uses the manner 1 to generate the key used for communication with the terminal, that is, the first base station and the second base station use a same security key to generate respective keys used for communication with the terminal, the method further includes the following two manners:

First manner: The first base station triggers the key refresh process, which is specifically as follows:

receiving, by the second base station, first key refresh instruction information sent by the first base station, where the first key refresh instruction information is used to instruct the second base station to refresh the key used for communication with the terminal; and generating, by the second base station, a new security key according to information carried in the first key refresh instruction information, and generating, according to the new security key, a key used for communication with the terminal.

In this manner, the first base station sends the first key refresh instruction information to the second base station after determining that key refresh needs to be performed, and specifically: the first base station may actively trigger key refresh, that is, when a set key refresh trigger condition is satisfied, the first base station determines that key refresh needs to be performed; or the first base station may determine, after receiving a refresh request sent by the second base station, that key refresh needs to be performed.

For the key refresh trigger condition, refer to a trigger condition in an existing key refresh process in single connectivity mode, and for details, refer to the protocol 33.401, that is, the security architecture (SA) in the system architecture evolution (SAE) of the $3^{rd}$ Generation Partnership (3GPP). For example, for a radio bearer, the key refresh process is triggered when a Packet Data Convergence Protocol (PDCP) count (COUNT) value of the radio bearer is going to be reversed.

Further, preferably, the key refresh request sent by the second base station to the first base station includes information about a cell (such as identification information of the cell and/or frequency information of the cell), where the cell is selected for the terminal by the second base station from cells that are covered by the second base station and can be randomly accessed during the current key refresh process.

In this embodiment of the present disclosure, the first key refresh instruction information includes: a PCI and frequency information of a target cell that are used for the current key refresh and a next hop (NH) value used for the current key refresh; or instruction information used to instruct to perform key refresh by using a PCI and frequency information of a current primary cell of the terminal, and an NH value used for the current key refresh.

Further, the first key refresh instruction information further includes information about a cell (such as identification information of the cell and/or frequency information of the cell), where the cell is specified by the first base station for random access performed by the terminal, so that the terminal performs random access in the specified cell; or the first key refresh instruction information further carries instruction information used to instruct the terminal not to perform random access, so that the terminal ignores the random access process.

The cell that is carried in the first key refresh instruction information and that is specified by the first base station for random access performed by the terminal and the foregoing target cell (or the primary cell) may be a same cell, or may be different cells, and if they are a same cell, the first key refresh instruction information needs to carry the cell only once.

Correspondingly, after receiving the first key refresh instruction information, the second base station generates a new security key according to information carried in the first key refresh instruction information, and generates, according to the new security key, a key used for communication with the terminal.

Specifically, if the first key refresh instruction information includes the PCI and the frequency information of the target cell that are used for the current key refresh, and the next hop NH value used for the current key refresh, the second base station generates a new security key according to the indicated NH value and the indicated PCI and frequency information of the target cell, and generates a key used for communication with the terminal according to the new security key; or if the first key refresh instruction information includes the instruction information used to instruct the terminal to perform key refresh by using the PCI and the frequency information of the current primary cell of the terminal, and the NH value used for the current key refresh, the second base station generates a new security key according to the indicated NH value and the indicated PCI and frequency information of the current primary cell of the terminal, and generates a key used for communication with the terminal according to the new security key.

In implementation, the first base station generates a new security key in a manner the same as that of the second base station, and generates, according to the new security key, a key used for communication with the terminal, so as to complete local key refresh. This embodiment of the present disclosure does not limit a moment at which the first base station performs local key refresh, and the first base station may perform local key refresh at any moment after determining that key refresh needs to be performed.

In this manner, further, the method provided by this embodiment of the present disclosure further includes: triggering the terminal to perform key refresh, which specifically includes the following two trigger manners:

1. The second base station triggers the terminal to perform key refresh, which is specifically as follows:

after receiving the first key refresh instruction information sent by the first base station, sending, by the second base station, second key refresh instruction information to the terminal, and after receiving second feedback information that is returned by the terminal to notify that current key refresh has been completed, notifying the first base station that the terminal has completed the current key refresh, where the second key refresh instruction information is used to instruct the terminal to refresh a key used for communication with the first base station and the key used for communication with the second base station.

This embodiment of the present disclosure does not limit a moment at which the second base station triggers the terminal to perform key refresh, and the second key refresh instruction information may be sent at any moment after the first key refresh instruction information sent by the first base station is received.

2. The first base station triggers the terminal to perform key refresh, which is specifically as follows:

after determining that key refresh needs to be performed, sending, by the first base station, second key refresh instruction information to the terminal, and after receiving second feedback information that is returned by the terminal to notify that current key refresh has been completed, communicating with the terminal by using a refreshed key, where the second key refresh instruction information is used to instruct the terminal to refresh a key used for communication with the first base station and the key used for communication with the second base station.

This embodiment of the present disclosure does not limit a moment at which the first base station triggers the terminal to perform key refresh, and the second key refresh instruction information may be sent at any moment after the first base station determines that key refresh needs to be performed.

In the first manner, preferably, when receiving the first key refresh instruction information sent by the first base station, the second base station temporarily stops data transmission between the second base station and the terminal, to avoid packet loss of data; and after determining that both the second base station and the terminal have completed local key refresh, the second base station resumes, by using a refreshed key, communication with the terminal. Certainly, in a case in which packet loss of data is allowed, after receiving the first key refresh instruction information sent by the first base station, the second base station may not temporarily stop data transmission between the second base station and the terminal.

In the first manner, preferably, when determining that key refresh needs to be performed, the first base station temporarily stops data transmission between the first base station and the terminal, to avoid packet loss of data; and after determining that the first base station, the second base station and the terminal have all completed local key refresh, the first base station resumes, by using the refreshed key, communication with the terminal. Certainly, in a case in which packet loss of data is allowed, when determining that key refresh needs to be performed, the first base station may not temporarily stop data transmission between the first base station and the terminal.

It should be noted that, if the first base station is the primary base station, when determining that key refresh needs to be performed, the first base station temporarily stops data transmission between the first base station and the terminal and temporarily stops forwarding data to the second base station; and if the second base station is the primary base station, when determining that key refresh needs to be performed, the second base station temporarily stops data transmission between the second base station and the terminal and temporarily stops forwarding data to the first base station.

Second manner: The second base station triggers the key refresh process, which is specifically as follows:

after determining that key refresh needs to be performed, sending, by the second base station, first key refresh instruction information to the first base station, where the first key refresh instruction information is used to instruct the first base station to refresh the key used for communication with the terminal; and after the second base station receives first feedback information that is returned by the first base station to notify that current key refresh has been completed, and the second base station completes local key refresh, communicating, by the second base station, with the terminal by using a refreshed key.

In this manner, a process of performing local key refresh by the second base station is the same as a process of performing local key refresh by the first base station in the foregoing first manner, and details are not described herein again.

In this manner, further, the method in this embodiment of the present disclosure further includes: triggering the terminal to perform key refresh, which specifically includes the following two trigger manners:

1. The second base station triggers the terminal to perform key refresh, which is specifically as follows:

after determining that key refresh needs to be performed, sending, by the second base station, second key refresh instruction information to the terminal, and after receiving second feedback information that is returned by the terminal to notify that current key refresh has been completed, communicating with the terminal by using the refreshed key, where the second key refresh instruction information is used to instruct the terminal to refresh a key used for communication with the first base station and the key used for communication with the second base station.

2. The first base station triggers the terminal to perform key refresh, which is specifically as follows:

after receiving the first key refresh instruction information sent by the second base station, sending, by the first base station, second key refresh instruction information to the terminal, and after receiving second feedback information that is returned by the terminal to notify that current key refresh has been completed, notifying the second base station that the terminal has completed the current key refresh, where the second key refresh instruction information is used to instruct the terminal to refresh a key used for communication with the first base station and the key used for communication with the second base station.

Preferably, based on the foregoing second manner, when determining that key refresh needs to be performed, the second base station temporarily stops data transmission related to the terminal, to avoid packet loss of data; and after determining that both the second base station and the terminal have completed local key refresh, or after determining that the second base station, the first base station, and the terminal have all completed local key refresh, the second base station resumes, by using the refreshed key, data transmission related to the terminal. Certainly, in a case in which packet loss of data is allowed, when determining that key refresh needs to be performed, the second base station may not temporarily stop data transmission related to the terminal.

Preferably, based on the foregoing second manner, when receiving the first key refresh instruction information sent by the second base station, the first base station temporarily stops data transmission related to the terminal, to avoid packet loss of data; and after determining that both the first base station and the terminal have completed local key refresh, the first base station resumes, by using a refreshed key, data transmission related to the terminal. Certainly, in a case in which packet loss of data is allowed, after receiving the first key refresh instruction information of the second base station, the first base station may not temporarily stop data transmission related to the terminal.

It should be noted that, if the first base station is the primary base station, when determining that key refresh needs to be performed, the first base station temporarily stops data transmission between the first base station and the terminal and temporarily stops forwarding data to the second base station; and if the second base station is the primary base station, when determining that key refresh needs to be performed, the second base station temporarily stops data transmission between the second base station and the terminal and temporarily stops forwarding data to the first base station.

Because a manner in which the second base station triggers key refresh is similar to the foregoing first manner in which the first base station triggers key refresh, for details, refer to the description in the foregoing first manner.

Based on the foregoing two trigger manners in the first case, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Based on the foregoing two trigger manners in the first case, after receiving the second key refresh instruction information, the terminal performs key refresh according to information carried in the second key refresh instruction information, and for details, refer subsequent descriptions related to the terminal side.

Further, preferably, the second key refresh instruction information further includes information about a cell (such as identification information of the cell and/or frequency information of the cell), where the cell is specified by the first base station or the second base station for random access performed by the terminal, so that when performing random access, the terminal performs random access in the specified cell; or the second key refresh instruction information further includes instruction information used to instruct the terminal not to perform random access, so that the terminal ignores the random access process.

It should be noted that, the cell that is included in the second key refresh instruction information and that is specified by the first base station or the second base station for random access performed by the terminal may be a target cell, determined by the first base station or the second base station, used for the current key refresh (or a current primary cell of the terminal), or may be another cell that is specified by the first base station or the second base station for the terminal and that can be randomly accessed. If the cell specified by the first base station or the second base station for random access performed by the terminal may be the target cell, determined by the first base station or the second base station, used for the current key refresh (or the current primary cell of the terminal), the second key refresh instruction information needs to carry the cell only once, and after receiving the second key refresh instruction information, the terminal performs random access in the specified target cell (or the current primary cell of the terminal), and generates a new security key according to the PCI and the frequency information of the specified target cell (or of the current primary cell of the terminal) and the NH value used for the current key refresh.

In the first case, because the first base station and the second base station use a same security key to generate respective keys used for communication with the terminal, both the first base station and the second base station need to perform key refresh.

Case 2: In the foregoing key generation process, if the second base station uses the manner 2 or manner 3 to generate the key used for communication with the terminal, that is, the first base station and the second base station use different security keys to generate respective keys used for communication with the terminal, the method further includes the following two manners:

First manner: The first base station is triggered to perform key refresh, which is specifically as follows:
  receiving, by the second base station, first instruction information sent by the first base station, where the first instruction information is used to instruct to temporarily stop data transmission related to the terminal; and
  temporarily stopping, by the second base station, data transmission related to the terminal, and after receiving an instruction that is sent by the first base station and that is used to instruct to resume data transmission related to the terminal, resuming data transmission related to the terminal.

In this manner, the first base station performs a local key refresh process, which is specifically as follows:
  generating, by the first base station, a new security key according to a PCI and frequency information of a target cell that are used for the current key refresh, and generating, according to the new security key, a key used for communication with the terminal; or
  generating, by the first base station, a new security key according to a PCI and frequency information of a current primary cell of the terminal, and generating, according to the new security key, a key used for communication with the terminal.

Further, the method further includes: triggering the terminal to perform key refresh, which specifically includes the following two trigger manners:
  1. The first base station triggers the terminal to perform key refresh, which is specifically as follows:
  after determining that key refresh needs to be performed, sending, by the first base station, second key refresh instruction information to the terminal, and after receiving second feedback information that is returned by the terminal to notify that current key refresh has been completed, communicating with the terminal by using a refreshed key, and notifying the second base station to resume data transmission related to the terminal, where the second key refresh instruction information is used to instruct the terminal to refresh a key used for communication with the first base station.

This embodiment of the present disclosure does not limit a moment at which the first base station triggers the terminal to perform key refresh, and the second key refresh instruction information may be sent at any moment after the first base station determines that key refresh needs to be performed.

2. The second base station triggers the terminal to perform key refresh, which is specifically as follows:
  after receiving the first instruction information sent by the first base station, sending, by the second base station, second key refresh instruction information to the terminal, and after receiving second feedback information that is returned by the terminal to notify that current key refresh has been completed, notifying the first base station that the terminal has completed the current key refresh, where the second key refresh instruction information is used to instruct the terminal to refresh a key used for communication with the first base station.

This embodiment of the present disclosure does not limit a moment at which the second base station triggers the terminal to perform key refresh, and the second key refresh instruction information may be sent at any moment after the second base station receives the first instruction information sent by the first base station.

In the first manner, preferably, when determining that key refresh needs to be performed, the first base station temporarily stops data transmission related to the terminal, to avoid packet loss of data; and after determining that both the first base station and the terminal have completed local key refresh, the first base station resumes, by using the refreshed key, data transmission related to the terminal. Certainly, in a case in which packet loss of data is allowed, when determining that key refresh needs to be performed, the first base station may not temporarily stop data transmission related to the terminal.

It should be noted that, if the first base station is the primary base station, when determining that key refresh needs to be performed, the first base station temporarily stops data transmission related to the terminal and temporarily stops forwarding data to the second base station.

Second manner: The second base station is triggered to perform key refresh, which is specifically as follows:

after determining that local key refresh needs to be performed, sending, by the second base station, first instruction information to the first base station, where the first instruction information is used to instruct to temporarily stop data transmission related to the terminal.

Correspondingly, after receiving the first instruction information, the first base station temporarily stops data transmission related to the terminal. If the first base station is the primary base station, after receiving the first instruction information, the first base station temporarily stops forwarding data of the terminal to the second base station.

In this manner, the second base station performs a local key refresh process, which is specifically as follows:

generating, by the second base station, a new security key according to a PCI and frequency information of a target cell that are used for the current key refresh (where the target cell may be determined by the first base station or determined by the second base station), and generating, according to the new security key, a key used for communication with the terminal; or generating, by the second base station, a new security key according to a PCI and frequency information of a current primary cell of the terminal, and generating, according to the new security key, a key used for communication with the terminal.

Further, the method further includes: triggering the terminal to perform key refresh, which specifically includes the following two trigger manners:

1. The second base station triggers the terminal to perform key refresh, which is specifically as follows:

after determining that key refresh needs to be performed, sending, by the second base station, second key refresh instruction information to the terminal, and after receiving second feedback information that is returned by the terminal to notify that current key refresh has been completed, communicating with the terminal by using a refreshed key, and sending, to the first base station, an instruction used to instruct to resume data transmission related to the terminal, where the second key refresh instruction information is used to instruct the terminal to refresh the key used for communication with the second base station.

This embodiment of the present disclosure does not limit a moment at which the second base station triggers the terminal to perform key refresh, and the second key refresh instruction information may be sent at any moment after the second base station determines that key refresh needs to be performed.

2. The first base station triggers the terminal to perform key refresh, which is specifically as follows:

after receiving the first instruction information sent by the second base station, sending, by the first base station, second key refresh instruction information to the terminal, and after receiving second feedback information that is returned by the terminal to notify that current key refresh has been completed, notifying the second base station that the terminal has completed the current key refresh, where the second key refresh instruction information is used to instruct the terminal to refresh the key used for communication with the second base station.

This embodiment of the present disclosure does not limit a moment at which the first base station triggers the terminal to perform key refresh, and the second key refresh instruction information may be sent at any moment after the first base station receives the first instruction information sent by the second base station.

In the second manner, preferably, when determining that key refresh needs to be performed, the second base station temporarily stops data transmission related to the terminal, to avoid packet loss of data; and after determining that both the second base station and the terminal have completed local key refresh, the second base station resumes, by using a refreshed key, communication with the terminal. Certainly, in a case in which packet loss of data is allowed, when determining that key refresh needs to be performed, the second base station may not temporarily stop data transmission related to the terminal.

Based on the foregoing two trigger manners in the second case, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Further, preferably, the second key refresh instruction information further includes information about a cell (such as identification information of the cell and/or frequency information of the cell), where the cell is specified by the first base station or the second base station for random access performed by the terminal, so that when performing random access, the terminal performs random access in the specified cell.

In the second case, because the first base station and the second base station use different security keys to generate respective keys used for communication with the terminal, the first base station and the second base station do not need to perform key refresh simultaneously, and specifically:

if the first base station is triggered, the first base station refreshes the key used for communication with the terminal and the terminal refreshes the key used for communication with the first base station; or if the second base station is triggered, the second base station refreshes the key used for communication with the terminal and the terminal refreshes the key used for communication with the second base station.

Based on the foregoing first case and the foregoing second case, an existing RRC reconfiguration message (such as a handover (Handover, HO) command) may be used as the second key refresh instruction information sent by the first base station or the second base station to the terminal, so as to reduce system signaling overheads. Certainly, another existing message or a newly defined message may also be used as the second key refresh instruction information.

II. Key-Rekey:

In implementation, the key-rekey provided in this embodiment of the present disclosure specifically includes the following two cases:

Case 1: In the foregoing key generation process, if the second base station uses manner 1 to generate the key used for communication with the terminal, that is, the first base station and the second base station use a same security key to generate respective keys used for communication with the terminal, the method further includes:

receiving, by the second base station, first key-rekey instruction information sent by the first base station, where the first key-rekey instruction information carries a new security key that is acquired by the first base station from the MME;

updating, by the second base station according to the new security key carried in the first key-rekey instruction information, the key used for communication with the terminal; and after completing the current key-rekey, returning, by the second base station to the first base station, first reply information used to notify that the current key-rekey has been completed.

It should be noted that, in the first case, the key-rekey process is triggered by a primary base station of the terminal (for example, a base station to which a macro cell belongs, or a base station to which a primary cell belongs), that is, the first base station involved in the key-rekey process is the primary base station of the terminal, and the second base station is a secondary base station of the terminal (for example, a base station to which a small cell belongs or a base station to which a secondary cell belongs), and specifically:

when a key-rekey trigger condition is satisfied (for example, when the MME generates a new security key for the first base station), the first base station determines that key-rekey needs to be performed, and sends first key-rekey instruction information to the second base station, so as to instruct the second base station to update, according to the new security key, the key used for communication with the terminal; or after receiving a key-rekey request sent by the second base station, the first base station determines that key-rekey needs to performed, and sends first key-rekey instruction information to the second base station, so as to instruct the second base station to update, according to the new security key, the key used for communication with the terminal.

For the key-rekey trigger condition, refer to a trigger condition in an existing key-rekey process in single connectivity mode, and for details, refer to the protocol 33.401, that is, the security architecture in the 3GPP system architecture evolution. For example, the key-rekey process is triggered when the MME needs to activate security context that is different from current access stratum security context of an evolved packet system (EPS).

In implementation, the method further includes executing, by the first base station, local key-rekey, which is specifically as follows:

updating, by the first base station according to the new security key acquired from the MME, the key used for communication with the terminal.

This embodiment of the present disclosure does not limit a moment at which the first base station performs local key-rekey, and the first base station may perform local key-rekey at any moment after determining that key-rekey needs to be performed.

Further, the method further includes: triggering the terminal to perform key-rekey, which specifically includes the following two trigger manners:

1. The first base station triggers the terminal to perform key-rekey, which is specifically as follows:

after determining that key-rekey needs to be performed, sending, by the first base station, second key-rekey instruction information to the terminal, and after receiving second reply information that is returned by the terminal to notify that current key-rekey has been completed, notifying the second base station that the terminal has completed the current key-rekey, where the second key-rekey instruction information is used to instruct the terminal to update a key used for communication with the first base station and the key used for communication with the second base station.

Correspondingly, after the second base station receives the notification sent by the first base station and the second base station completes local key-rekey, the second base station communicates with the terminal by using an updated key.

This embodiment of the present disclosure does not limit a moment at which the first base station triggers the terminal to perform key-rekey, and the second key-rekey instruction information may be sent at any moment after the first base station determines that key-rekey needs to be performed.

2. The second base station triggers the terminal to perform key-rekey, which is specifically as follows:

after receiving the first key-rekey instruction information sent by the first base station, sending, by the second base station, second key-rekey instruction information to the terminal, and after receiving second reply information that is returned by the terminal to notify that current key-rekey has been completed, notifying the first base station that the terminal has completed the current key-rekey, where the second key-rekey instruction information is used to instruct the terminal to update a key used for communication with the first base station and the key used for communication with the second base station.

Further, after the second base station receives the second reply information that is returned by the terminal to notify that current key-rekey has been completed and the second base station completes local key-rekey, the second base station communicates with the terminal by using an updated key.

In implementation, based on the foregoing first case, preferably, when receiving the first key-rekey instruction information sent by the first base station, the second base station temporarily stops data transmission related to the terminal, so as to avoid packet loss of data; and after the second base station determines that both the second base station and the terminal have completed local key-rekey or after the second base station determines that the second base station, the first base station, and the terminal have all completed local key-rekey, the second base station resumes, by using the updated key, communication with the terminal. Certainly, in a case in which packet loss of data is allowed, when receiving the first key-rekey instruction information sent by the first base station, the second base station may not temporarily stop data transmission related to the terminal.

Preferably, the second key-rekey instruction information further includes information about a cell that is specified by the first base station for random access performed by the terminal (where the specified cell may be one or more secondary cells or small cells, or may be a current primary cell of the terminal), so that the terminal performs random access in the specified cell; or the second key-rekey instruction information further includes instruction information used to instruct the terminal not to perform random access, so that the terminal ignores the random access process.

In implementation, based on the foregoing first case, preferably, when determining that key-rekey needs to be performed, the first base station temporarily stops data transmission related to the terminal and temporarily stops forwarding data of the terminal to the second base station, so as to avoid packet loss of data; and after determining that the first base station, the second base station, and the terminal have all completed local key-rekey, the first base station resumes, by using an updated key, data transmission related to the terminal and resumes forwarding data of the terminal to the second base station. Certainly, in a case in which packet loss of data is allowed, when determining that key-rekey needs to be performed, the first base station may not temporarily stop data transmission related to the terminal and not temporarily stop forwarding data of the terminal to the second base station.

Based on the foregoing first case, an existing RRC reconfiguration message may be used as the second key-rekey instruction information sent by the first base station or second base station to the terminal, so as to reduce system signaling overheads. Certainly, another existing message or a newly defined message may also be used as the second key-rekey instruction information.

Case 2: In the foregoing key generation process, if the second base station uses manner 2 or manner 3 to generate the key used for communication with the terminal, that is, the first base station and the second base station use different security keys to generate respective keys used for communication with the terminal, the method further includes the following two manners:

First manner: the first base station is triggered to perform key-rekey, which is specifically as follows:
    receiving, by the second base station, first instruction information sent by the first base station, where the first instruction information is used to instruct to temporarily stop data transmission related to the terminal; and
    temporarily stopping, by the second base station, data transmission related to the terminal, and after receiving an instruction that is sent by the first base station and that is used to instruct to resume data transmission related to the terminal, resuming data transmission related to the terminal.

Specifically, after the first base station determines that a set key-rekey trigger condition is satisfied, the first base station first sends the first instruction information to the second base station, to instruct to temporarily stop data transmission related to the terminal; then, the first base station acquires a new first security key that is generated by the MME for the first base station, and generates, according to the new first security key and a security algorithm of the first base station, the key used for communication with the terminal; and finally, the first base station sends, to the second base station, the instruction used to instruct to resume data transmission related to the terminal.

Further, the method further includes: triggering the terminal to perform key-rekey, which specifically includes the following two trigger manners:

1. The first base station triggers the terminal to perform key-rekey, which is specifically as follows:
    after determining that key-rekey needs to be performed, sending, by the first base station, second key-rekey instruction information to the terminal, and after receiving second reply information that is returned by the terminal to notify that current key-rekey has been completed, communicating with the terminal by using an updated key, and notifying the second base station to resume data transmission related to the terminal, where the second key-rekey instruction information is used to instruct the terminal to update a key used for communication with the first base station.

This embodiment of the present disclosure does not limit a moment at which the first base station triggers the terminal to perform key-rekey, and the second key-rekey instruction information may be sent at any moment after the first base station determines that key-rekey needs to be performed.

2. The second base station triggers the terminal to perform key-rekey, which is specifically as follows:
    after receiving the first instruction information sent by the first base station, sending, by the second base station, second key-rekey instruction information to the terminal, and after receiving second reply information that is returned by the terminal to notify that current key-rekey has been completed, notifying the first base station that the terminal has completed the current key-rekey, where the second key-rekey instruction information is used to instruct the terminal to update a key used for communication with the first base station and the key used for communication with the second base station.

This embodiment of the present disclosure does not limit a moment at which the second base station triggers the terminal to perform key-rekey, and the second key-rekey instruction information may be sent at any moment after the second base station receives the first instruction information sent by the first base station.

In the first manner, preferably, when determining that key-rekey needs to be performed, the first base station temporarily stops data transmission related to the terminal, so as to avoid packet loss of data; and after determining that both the first base station and the terminal have completed local key-rekey, the first base station resumes, by using the updated key, data transmission related to the terminal. Certainly, in a case in which packet loss of data is allowed, when determining that key-rekey needs to be performed, the first base station may not temporarily stop data transmission related to the terminal.

It should be noted that, if the first base station is the primary base station, when determining that key-rekey needs to be performed, the first base station temporarily stops data transmission related to the terminal and temporarily stops forwarding data to the second base station.

Second manner: the second base station is triggered to perform key-rekey, which is specifically as follows:
    after determining that local key-rekey needs to be performed, sending, by the second base station, first instruction information to the first base station, where the first instruction information is used to instruct to temporarily stop data transmission related to the terminal.

Correspondingly, after receiving the first instruction information, the first base station temporarily stops data transmission related to the terminal. If the first base station is the primary base station, after receiving the first instruction information, the first base station temporarily stops forwarding data of the terminal to the second base station.

In this manner, the second base station performs a local key-rekey process, which is specifically as follows:

after determining that a set key-rekey trigger condition is satisfied, the second base station first sends the first instruction information to the first base station, to instruct to temporarily stop data transmission related to the terminal; then, the second base station acquires a new second security key that is generated by the MME for the second base station, and generates, according to the new second security key and a security algorithm of the second base station, the key used for communication with the terminal; and finally, the second base station sends, to the first base station, an instruction used to instruct to resume data transmission related to the terminal.

Further, the method further includes: triggering the terminal to perform key-rekey, which specifically includes the following two trigger manners:

1. The second base station triggers the terminal to perform key-rekey, which is specifically as follows:

after determining that key-rekey needs to be performed, sending, by the second base station, second key-rekey instruction information to the terminal, and after receiving second reply information that is returned by the terminal to notify that current key-rekey has been completed, communicating with the terminal by using an updated key, and sending, to the first base station, an instruction used to instruct to resume data transmission related to the terminal, where the second key-rekey instruction information is used to instruct the terminal to update the key used for communication with the second base station.

This embodiment of the present disclosure does not limit a moment at which the second base station triggers the terminal to perform key-rekey, and the second key-rekey instruction information may be sent at any moment after the second base station determines that key-rekey needs to be performed.

2. The first base station triggers the terminal to perform key-rekey, which is specifically as follows:

after receiving the first instruction information sent by the second base station, sending, by the first base station, second key-rekey instruction information to the terminal, and after receiving second reply information that is returned by the terminal to notify that current key-rekey has been completed, notifying the second base station that the terminal has completed the current key-rekey, where the second key-rekey instruction information is used to instruct the terminal to update the key used for communication with the second base station.

This embodiment of the present disclosure does not limit a moment at which the first base station triggers the terminal to perform key-rekey, and the second key-rekey instruction information may be sent at any moment after the first base station receives the first instruction information sent by the second base station.

In the second manner, preferably, when determining that key-rekey needs to be performed, the second base station temporarily stops data transmission related to the terminal, so as to avoid packet loss of data; and after determining that both the second base station and the terminal have completed local key-rekey, the second base station resumes, by using the updated key, communication with the terminal. Certainly, in a case in which packet loss of data is allowed, when determining that key-rekey needs to be performed, the second base station may not temporarily stop data transmission related to the terminal.

Preferably, the second key-rekey instruction information includes information about a cell (such as identification information of the cell and/or frequency information of the cell), where the cell is specified by the first base station or the second base station for random access performed by the terminal, so that when performing random access, the terminal performs random access in the specified cell.

In the second case, because the first base station and the second base station use different security keys to generate respective keys used for communication with the terminal, the first base station and the second base station do not need to perform key-rekey simultaneously.

Based on the foregoing first case and second case, an existing RRC reconfiguration message (such as a handover command) may be used as the second key-rekey instruction information sent by the first base station or the second base station to the terminal, so as to reduce system signaling overheads. Certainly, another existing message or a newly defined message may also be used as the second key-rekey instruction information.

Based on the foregoing processing performed by the first base station and the second base station in the key generation process, the key refresh process, and the key-rekey process, referring to FIG. 5, an embodiment of the present disclosure further provides a key processing method on a terminal side, where the method includes the following steps:

S51: A terminal that has a communication connection to a first base station and a communication connection to a second base station receives second request information sent by the first base station or the second base station, where the second request information is used to request the terminal to generate a key used for communication with the second base station.

The second request information carries identification information of a security algorithm used by the second base station.

S52: The terminal generates, according to the received second request information, the key used for communication with the second base station.

In this embodiment of the present disclosure, the first base station is a primary base station of the terminal, for example, a base station to which a macro cell belongs, and the second base station is a secondary base station (that is, a SeNB) of the terminal, for example, a base station to which a small cell belongs.

In this embodiment of the present disclosure, a key used by the terminal for communication with a base station (including the first base station and the second base station) includes, but is not limited to, one of or a combination of the following keys:

a cipher key for a control-plane message, an integrity protection key for a control-plane message, and a cipher key for user-plane data.

In implementation, step S52 specifically includes the following three manners:

Manner 1: The terminal generates, according to the security algorithm used by the second base station and a security key that is generated by the terminal for the first base station, the key used for communication with the second base station.

Manner 2: The terminal generates, according to the security algorithm used by the second base station and a PCI and frequency information of a cell that are included in the second request information and that are used to generate a security key of the second base station, the key used for communication with the second base station.

Specifically, the terminal generates a corresponding security key according to the PCI and frequency information of the cell that are included in the second request information and that are used to generate the security key of the second base station, and generates, according to the generated security key and the security algorithm used by the second base station, the key used for communication with the second base station.

Manner 3: If the second request information includes instruction information used to instruct the terminal to generate a second security key for the second base station, the terminal generates the second security key of the second base station according to security context information that is stored by the terminal and that is used to generate the second security key, and generates, according to the second security key, the key used for communication with the second base station.

In this manner, because an MME and the terminal each may store multiple sets of security context information for generating a security key, to ensure that the MME and the terminal use same security context information to generate the second security key of the second base station, preferably, in implementation, the MME indicates, to the terminal, an identifier of security context information (such as a sequence number of the security context information) used to generate the second security key of the second base station.

Further, the terminal receives the identifier, indicated by the MME, of the security context information used to generate the second security key, and generates the corresponding second security key according to security context information that is stored by the terminal and that corresponds to the identifier.

In implementation, the method provided by this embodiment of the present disclosure further includes:
  performing, by the terminal, random access in the cell corresponding to the PCI and the frequency information that are included in the second request information and that are used to generate the security key of the second base station, so as to access the second base station; or
  performing, by the terminal, random access in another cell that is included in the second request information and that is specified by the first base station or the second base station for random access performed by the terminal, so as to access the second base station.

In implementation, the method provided by this embodiment of the present disclosure further includes: performing, by the terminal, a local key refresh process, which is specifically as follows:
  receiving, by the terminal, second key refresh instruction information sent by the first base station or the second base station, where the second key refresh instruction information is used to instruct the terminal to refresh a key used for communication with the first base station and/or the key used for communication with the second base station;
  generating, by the terminal, a new security key according to information carried in the second key refresh instruction information, and generating, based on the new security key, a key used for communication with the first base station and/or a key used for communication with the second base station; and
  returning, by the terminal to the first base station or the second base station, second feedback information used to notify that current key refresh has been completed.

It should be noted that, if the terminal receives the second key refresh instruction information sent by the first base station, after completing local key refresh, the terminal may return the second feedback information to the first base station, or return the second feedback information to the second base station (in this case, the second base station notifies the first base station of the received second feedback information); or
  if the terminal receives the second key refresh instruction information sent by the second base station, after completing local key refresh, the terminal may return the second feedback information to the first base station (in this case, the first base station notifies the second base station of the received second feedback information), or return the second feedback information to the second base station.

Further, the generating, by the terminal, a new security key according to information carried in the second key refresh instruction information, and generating, based on the new security key, a key used for communication with the first base station and/or a key used for communication with the second base station specifically includes:
  if the second key refresh instruction information includes a PCI and frequency information of a target cell that are used for the current key refresh, and an NH value used for the current key refresh, generating, by the terminal, a new security key according to the indicated NH value and the indicated PCI and frequency information of the target cell, and generating, according to the new security key, a key used for communication with the first base station and/or a key used for communication with the second base station; or
  if the second key refresh instruction information includes instruction information used to instruct the terminal to perform key refresh by using a PCI and frequency information of a current primary cell of the terminal, and an NH value used for the current key refresh, generating, by the terminal, a new security key according to the indicated NH value and the indicated PCI and frequency information of the current primary cell of the terminal, and generating, according to the new security key, a key used for communication with the first base station and/or a key used for communication with the second base station.

It should be noted that, if the first base station and the second base station use a same security key to generate respective keys used for communication with the terminal, after receiving the second key refresh instruction information sent by the first base station or the second base station, the terminal refreshes the key used for communication with the first base station and the key used for communication with the second base station; if the first base station and the second base station use different security keys to generate respective keys used for communication with the terminal, and the first base station is triggered to perform key refresh, after receiving the second key refresh instruction information sent by the first base station or the second base station, the terminal refreshes the key used for communication with the first base station; if the first base station and the second base station use different security keys to generate respective keys used for communication with the terminal, and the second base station is triggered to perform key refresh, after receiving the second key refresh instruction information sent by the first base station or the second base station, the terminal refreshes the key used for communication with the second base station.

Preferably, when sending the second key refresh instruction information to the terminal, the first base station or the second base station adds instruction information to the second key refresh instruction information, so as to instruct the terminal to refresh the key used for communication with the first base station, or refresh the key used for communication with the second base station, or refresh the key used for communication with the first base station and the key used for communication with the second base station.

In this embodiment of the present disclosure, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Further, preferably, the second key refresh instruction information further includes information about a cell (such as identification information of the cell and/or frequency information of the cell), where the cell is specified by the first base station or the second base station for random access performed by the terminal.

Specifically, if the second key refresh instruction information further includes information about a cell that is specified by the first base station or the second base station for random access performed by the terminal, the terminal performs random access in the cell; if the second key refresh instruction information instructs the terminal not to perform random access (for example, the second key refresh instruction information does not include information about a cell that is specified by the first base station or the second base station for random access performed by the terminal, or the second key refresh instruction information includes instruction information used to instruct the terminal not to perform random access), the terminal does not perform random access.

In implementation, the method provided by this embodiment of the present disclosure further includes:

receiving, by the terminal, second key-rekey instruction information sent by the first base station or the second base station, where the second key-rekey instruction information is used to instruct the terminal to update a key used for communication with the first base station and the key used for communication with the second base station;

generating, by the terminal, a new security key according to stored security context information, and generating, according to the new security key, a key used for communication with the first base station and a key used for communication with the second base station; and returning, by the terminal to the first base station or the second base station, second reply information used to notify that current key-rekey has been completed.

It should be noted that, if the terminal receives the second key-rekey instruction information sent by the first base station, after completing local key-rekey, the terminal may return the second reply information to the first base station, or return the second reply information to the second base station (in this case, the second base station notifies the first base station of the received second reply information); or if the terminal receives the second key-rekey instruction information sent by the second base station, after completing local key-rekey, the terminal may return the second reply information to the first base station (in this case, the first base station notifies the second base station of the received second reply information), or return the second reply information to the second base station.

The interaction among the first base station, the second base station, and the terminal in the key generation process, the key refresh process, and the key-rekey process provided in this embodiment of the present disclosure is described below with reference to the following five specific embodiments.

Embodiment 1

Figure 6:
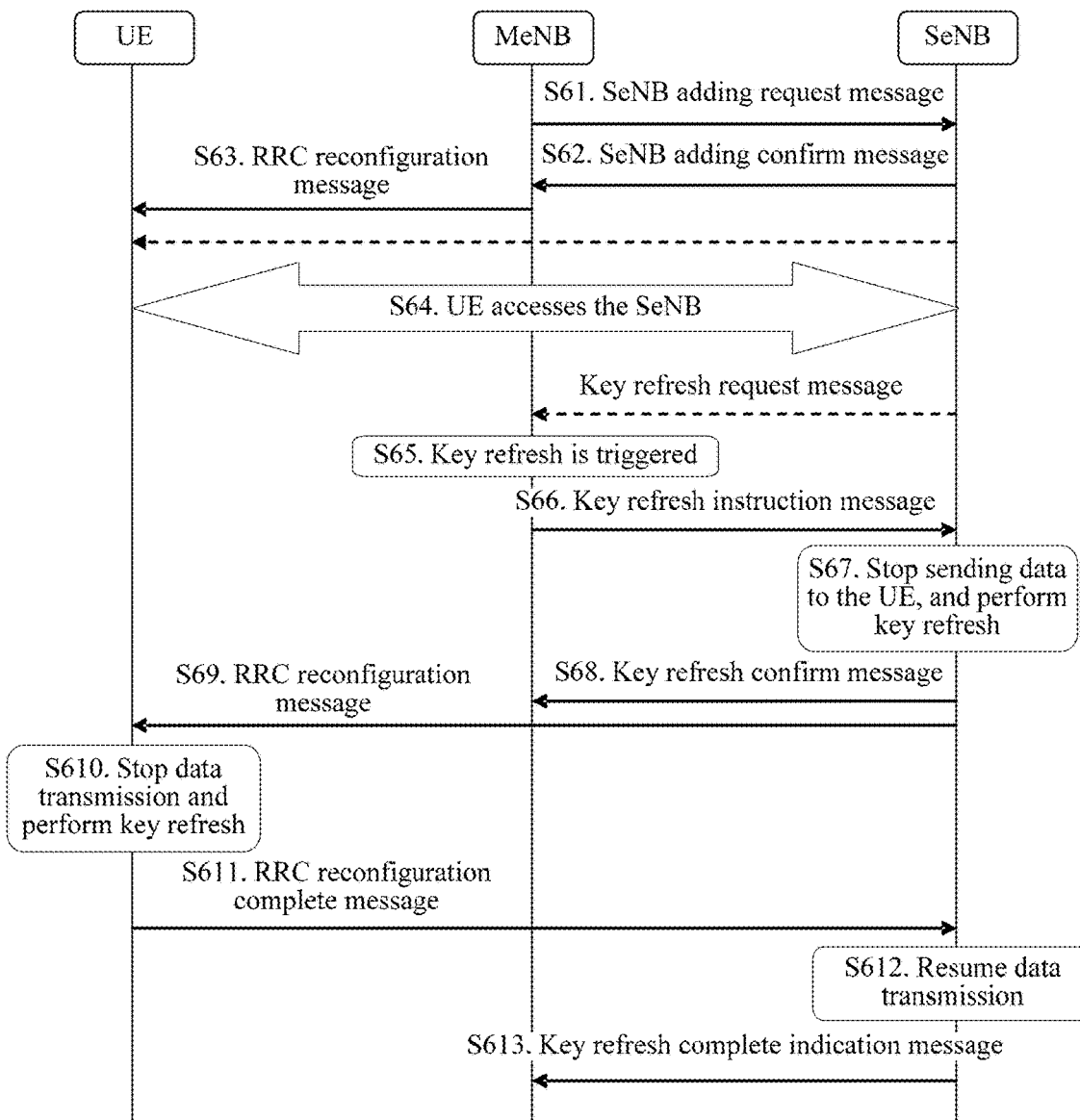
FIG. 6 is a schematic flowchart of Embodiment 1 according to an embodiment of the present disclosure.

In this embodiment, before key refresh, a MeNB and a SeNB that serve UE use a same security key $K_{eNB}$ to generate respective keys used for communication with the UE. Referring to FIG. 6, a process of generating an initial security key on a SeNB side is as follows:

S61: A MeNB sends a SeNB adding request message to a SeNB.

Specifically, a trigger condition for sending, by the MeNB, the SeNB adding request message to the SeNB may be that: the MeNB may offload, based on an offloading requirement of the MeNB, some services or some data to the SeNB for transmission, and therefore, needs to send the SeNB adding request message to the SeNB.

Further, the SeNB adding request message may include information about a specific service or data that needs to be offloaded to the SeNB. In addition, to enable the SeNB to determine a security key used by the MeNB, the SeNB adding request message needs to carry a security key $K_{eNB}$ currently used by the MeNB.

Preferably, the SeNB adding request message may include information about a SCell (secondary cell) recommended by the MeNB, so as to assist the SeNB in configuring a SCell for UE, where the SCell is a cell belonging to the SeNB, that is, a cell managed and controlled by the SeNB.

S62: After receiving the SeNB adding request message, the SeNB generates, according to $K_{eNB}$ carried in the SeNB adding request message and a security algorithm of the SeNB, a key used for communication with UE, for example, a cipher key $K_{enc}$ and/or an integrity protection key $K_{int}$. Then, the SeNB sends a SeNB adding confirm message to the MeNB, to confirm that the SeNB is allowed to share load of the MeNB.

Optionally, the SeNB adding confirm message may include an identifier of the security algorithm of the SeNB, information about a SCell configured by the SeNB for the UE, for example, identification information or frequency information of the SCell. The SCell is a cell managed and controlled by the SeNB, and the SCell configured by the SeNB for the UE includes at least a cell specified for random access performed by the UE and/or a cell used for current key refresh. Preferably, the cell specified for random access performed by the UE and the cell used for current key refresh is a same cell.

S63: The MeNB sends an RRC reconfiguration message to the UE, where the RRC reconfiguration message includes an identifier of the security algorithm used by the SeNB. Preferably, the RRC reconfiguration message further includes information about the SCell configured by the SeNB for the UE.

S64: After receiving the RRC reconfiguration message, the UE accesses the SeNB.

Specifically, the UE may perform random access in the specified SCell, so as to access the SeNB. Besides, the UE may generate, according to the security algorithm indicated in the RRC reconfiguration message and current $K_{eNB}$ of the UE, a key used for communication with the SeNB, for example, a cipher key $K_{enc}$ and/or an integrity protection key $K_{int}$.

After determining that key refresh needs to be performed, the MeNB triggers a key refresh process, which is specifically as follows:

S65: The MeNB actively triggers key refresh, or the MeNB is triggered to perform key refresh after receiving a key refresh request sent by the SeNB.

A key refresh request message sent by the SeNB to the MeNB may carry information about a SCell that is recommended by the SeNB and that can be randomly accessed by the UE during key refresh.

S66: The MeNB sends a key refresh instruction message to the SeNB, so as to instruct the SeNB to stop data transmission and perform a key refresh process.

The key refresh instruction message includes a PCI and frequency information of a target cell that are determined by the MeNB and that are used for the current key refresh, and an NH value used for the current key refresh; preferably, the key refresh instruction message may further include information about a SCell that can be randomly assessed by the UE during key refresh, where the information about the SCell may be identification information or frequency information of the SCell;

or the key refresh instruction message includes instruction information used to instruct to perform key refresh according to a PCI and a frequency of a current PCell of the UE, and an NH value used for the current key refresh; preferably, the key refresh instruction message may further include information about a SCell that can be randomly assessed by the UE during key refresh.

S67: After receiving the key refresh instruction message sent by the MeNB, the SeNB stops data transmission between the SeNB and the UE, and starts to perform key refresh. A specific key refresh process is as follows:

if the key refresh instruction message includes the PCI and the frequency information of the target cell that are used for the current key refresh and the NH value used for the current key refresh, the SeNB generates a new security key according to the indicated NH value and the indicated PCI and frequency information of the target cell, where the new security key is recorded as $K_{eNB}$; or if the key refresh instruction message includes the instruction information used to instruct to perform key refresh according to the PCI and the frequency of the current PCell of the UE, and the NH value used for the current key refresh, the SeNB generates a new security key $K_{eNB}$ according to the indicated NH value and the PCI and frequency information of the current PCell of the UE.

Further, the SeNB generates, based on $K_{eNB}$ and the security algorithm of the SeNB, the key used for communication with the UE, for example, a new cipher key $K_{enc}$ and/or integrity protection key $K_{int}$.

S68: The SeNB sends a key refresh confirm message to the MeNB.

Specifically, the message is not limited to being sent after the foregoing step S67, and the message may be sent to the MeNB at any moment after the SeNB determines to perform key refresh.

S69: The SeNB sends an RRC reconfiguration message to the UE.

The RRC reconfiguration message includes a PCI and frequency information of a target cell that are used for the current key refresh, and an NH value used for the current key refresh; preferably, the RRC reconfiguration message may further include information about a SCell that can be randomly assessed by the UE during key refresh, where the information about the SCell may be identification information or frequency information of the SCell;

or the RRC reconfiguration message includes instruction information used to instruct to perform key refresh according to a PCI and a frequency of a current PCell of the UE, and an NH value used for the current key refresh; preferably, the RRC reconfiguration message may further include information about a SCell that can be randomly assessed by the UE during key refresh.

Further, the RRC reconfiguration message is not limited to being sent after the foregoing step S67 or step S68, and the message may be sent to the MeNB at any moment after the SeNB determines to perform key refresh.

S610: After receiving the RRC reconfiguration message, the UE stops data transmission, and starts to perform key refresh.

Specifically, if the RRC reconfiguration message includes the PCI and the frequency information of the target cell that are used for the current key refresh and the NH value used for the current key refresh, the UE generates a new security key according to the indicated NH value and the indicated PCI and frequency information of the target cell, where the new security key is recorded as $K_{eNB}$; or if the RRC reconfiguration message includes the instruction information used to instruct to perform key refresh according to the PCI and the frequency of the current PCell of the UE, and the NH value used for the current key refresh, the UE generates a new security key $K_{eNB}$ according to the indicated NH value and the indicated PCI and frequency information of the target cell.

Further, the UE generates, according to new $K_{eNB}$, and a security algorithm of the MeNB, a new key used for communication with the MeNB, for example, a new cipher key $K_{enc}$ and/or integrity protection key $K_{int}$; besides, the UE generates, according to new $K_{eNB}$ and the security algorithm of the SeNB, a key used for communication with the SeNB, for example, a new cipher key $K_{enc}$ and/or integrity protection key $K_{int}$.

Further, if the RRC reconfiguration message further includes information about a SCell for random access performed by the UE, the UE performs random access in the indicated SCell. Otherwise, that is, if the RRC reconfiguration message instructs not to perform random access, the UE ignores a random access process.

S611: The UE sends an RRC reconfiguration complete message to the SeNB. Specifically:

If the RRC reconfiguration message further includes the information about a SCell for random access performed by the UE, after performing random access in the indicated SCell, the UE sends the RRC reconfiguration complete message to the SeNB; or if the RRC reconfiguration message instructs not to perform random access, the UE directly sends the RRC reconfiguration complete message to the SeNB.

Specifically, before sending the RRC reconfiguration complete message to the SeNB, the UE may first send a scheduling request to the SeNB.

S612: After receiving the RRC reconfiguration complete message sent by the UE, the SeNB starts to resume, by using a new security key, data transmission between the SeNB and the UE.

S613: The SeNB sends a security key refresh complete message to the MeNB.

S614: After receiving the security key refresh complete message sent by the SeNB, the MeNB starts to resume, by using the new security key, data transmission between the MeNB and the UE.

Embodiment 2

Figure 7:
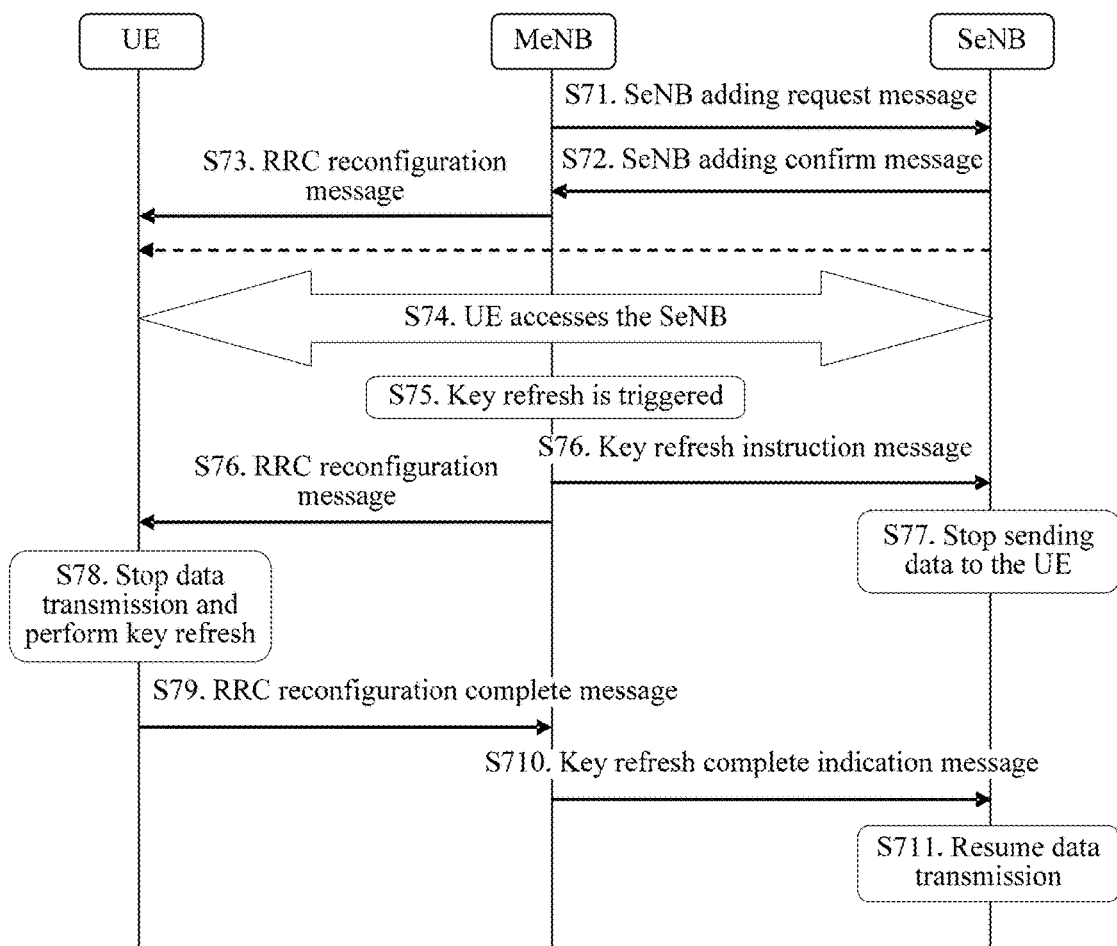
FIG. 7 is a schematic flowchart of Embodiment 2 according to an embodiment of the present disclosure.

In this embodiment, before key refresh, a MeNB and a SeNB that serve UE use different security keys to generate respective keys used for communication with the UE. Referring to FIG. 7, a process of generating an initial security key on a SeNB side is as follows:

S71: A MeNB sends a SeNB adding request message to a SeNB.

Specifically, a trigger condition for sending, by the MeNB, the SeNB adding request message to the SeNB may be that: the MeNB may offload, based on an offloading requirement of the MeNB, some services or some data to the SeNB for transmission, and therefore, needs to send the SeNB adding request message to the SeNB.

Further, the SeNB adding request message includes $K_{eNB}$ currently used by the MeNB, and instructs the SeNB to use new $K_{eNB'}$ different from $K_{eNB}$.

S72: The SeNB sends a SeNB adding confirm message to the MeNB, to confirm that the SeNB is allowed to share load of the MeNB.

Specifically, after receiving the SeNB adding request message, the SeNB determines to add one or more SCells for the UE, and determines a PCI and frequency information of at least one SCell, to generate new $K_{eNB'}$ different from $K_{eNB}$. Then, the SeNB sends the SeNB adding confirm message to the MeNB.

S73: The MeNB sends an RRC reconfiguration message to UE, where the RRC reconfiguration message includes an identifier of a security algorithm used by the SeNB, and a PCI and frequency information of a SCell that are used to generate $K_{eNB''}$. Preferably, the RRC reconfiguration message further includes information about one or more SCells configured by the SeNB for the UE.

S74: After receiving the RRC reconfiguration message, the UE accesses the SeNB.

Specifically, the UE may perform random access in the SCell that is used to generate $K_{eNB''}$, so as to access the SeNB; or the UE may also perform random access in another specified cell for random access, so as to access the SeNB. Besides, the UE generates $K_{eNB'}$ according to the PCI and frequency information of the SCell that are indicated in the RRC reconfiguration message and that are used to generate $K_{eNB''}$.

Further, the UE generates, according to the identifier, indicated in the RRC reconfiguration message, of the security algorithm used by the SeNB, and the generated $K_{eNB''}$, a key used for communication with the SeNB, for example, a cipher key $K_{enc}$ and/or an integrity protection key $K_{int}$.

In a process of generating an initial key performed by the SeNB, in addition to the foregoing method for generating, on the SeNB side, a security key different from that of the MeNB, the following method may also be used to generate, on the SeNB side, a security key different from that of a MeNB side. A specific process is as follows:

S71: A MeNB sends a SeNB adding request message to a SeNB, where the SeNB adding request message includes a security key $K_{eNB'}$ that is generated by an MME for the SeNB.

S72: After receiving the SeNB adding request message, the SeNB determines to add one or more SCells for UE, and sends a SeNB adding confirm message to the MeNB, so as to confirm that the SeNB is allowed to share load of the MeNB.

S73: The MeNB sends an RRC reconfiguration message to the UE, where the RRC reconfiguration message includes an identifier of a security algorithm used by the SeNB. Further, the RRC reconfiguration message further includes instruction information used to instruct the UE to generate $K_{eNB''}$.

S74: After receiving the RRC reconfiguration message, the UE accesses the SeNB.

Specifically, the UE may first generate $K_{ASME'}$ according to a second K, a second IK, and a second CK that are maintained locally and that are related to the SeNB, and then generate $K_{eNB'}$ according to $K_{ASME'}$. The second K, the second IK, and the second CK are related parameters that are maintained by the UE locally and that are used to generate the security key of the SeNB.

Further, the UE generates, according to the security algorithm of the SeNB and the generated $K_{eNB''}$, a key used for communication with the SeNB, for example, a cipher key $K_{enc}$ and/or an integrity protection key $K_{int}$.

Based on the foregoing two methods of generating an initial key on the SeNB side, after determining that key refresh needs to be performed, the MeNB triggers a key refresh process, which is specifically as follows:

S75: The MeNB is triggered to perform local key refresh.

Preferably, after being triggered to perform local key refresh, the MeNB temporarily stops data transmission between the MeNB and the UE and temporarily stops forwarding data of the UE to the SeNB.

S76: The MeNB sends a key refresh instruction message to the SeNB, so as to instruct the SeNB to temporarily stop data transmission between the SeNB and the UE, and the MeNB sends an RRC reconfiguration message to the UE.

The RRC reconfiguration message includes a PCI and frequency information of a target cell that are used for the current security key refresh and an NH value used for the current key refresh; or instruction information used to instruct to perform key refresh according to a PCI and a frequency of a current PCell of the UE, and an NH value used for the current key refresh.

This step does not limit a sequence of sending the RRC reconfiguration message by the MeNB to the UE and sending the key refresh instruction message by the MeNB to the SeNB.

S77: After receiving the key refresh instruction message sent by the MeNB, the SeNB temporarily stops data transmission between the SeNB and the UE.

S78: After receiving the RRC reconfiguration message, the UE stops performing data transmission and starts to perform key refresh.

Specifically, the UE may generate a new security key, that is, $K_{eNB''}$, according to the NH value indicated in the RRC reconfiguration message, and the PCI and frequency information of the target cell or PCell that are indicated in the RRC reconfiguration message, and generate, according to $K_{eNB'}$ and a security algorithm of the MeNB, a new key used for communication with the MeNB.

Further, the UE may further perform random access in the target cell or PCell indicated in the RRC reconfiguration message.

S79: The UE performs random access in the target cell or PCell indicated in the RRC reconfiguration message, and sends an RRC reconfiguration complete message to the MeNB.

S710: After receiving the RRC reconfiguration complete message sent by the UE, the MeNB sends a key refresh complete indication message to the SeNB, and after determining that the MeNB completes local key refresh, the MeNB communicates with the UE by using a refreshed key.

S711: After receiving the key refresh complete indication message sent by the MeNB, the SeNB starts to resume data transmission between the SeNB and the UE.

Embodiment 3

Figure 8:
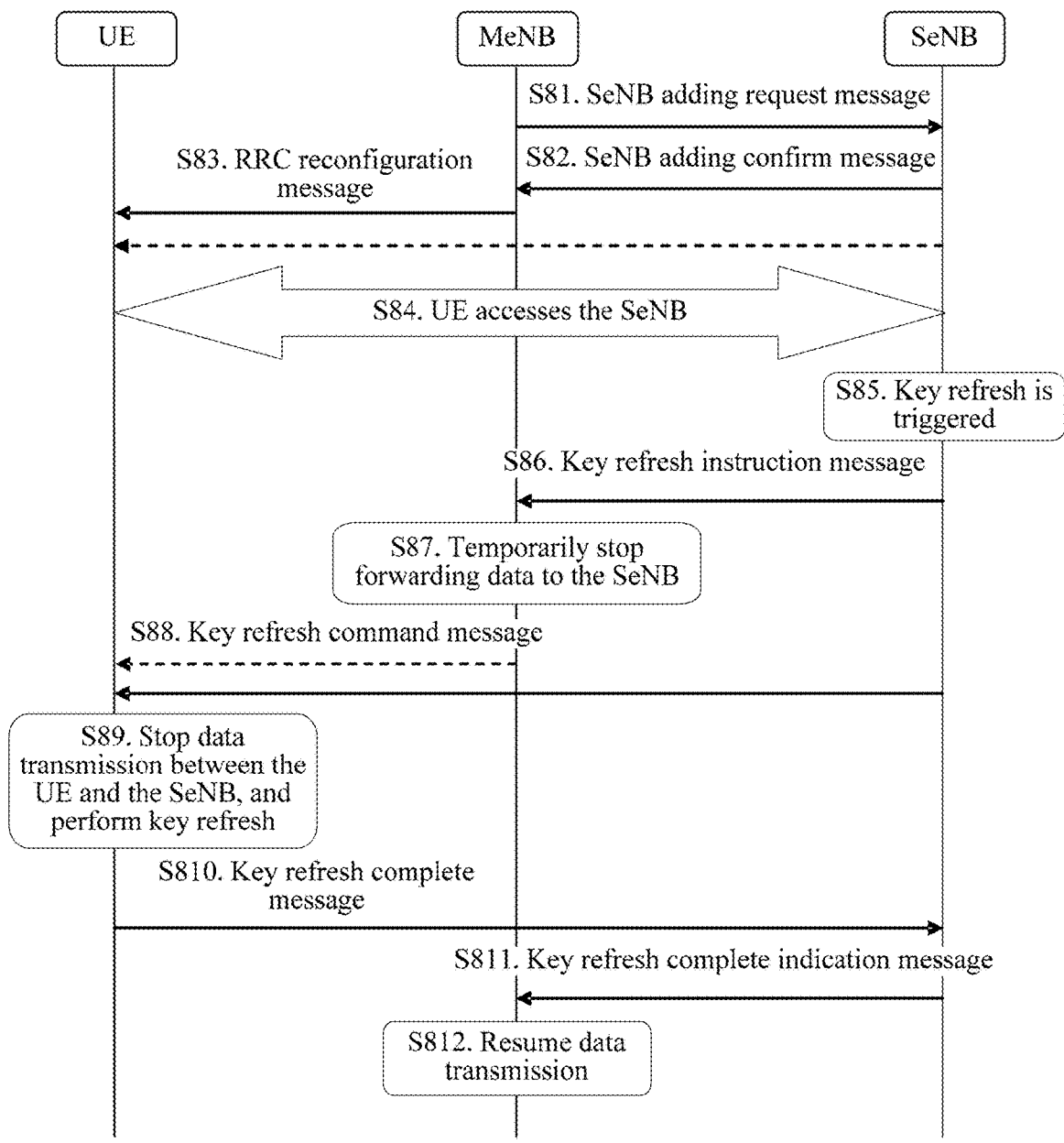
FIG. 8 is a schematic flowchart of Embodiment 3 according to an embodiment of the present disclosure.

This embodiment differs from Embodiment 2 in that, in this embodiment, a SeNB is triggered to perform a local key refresh process. Referring to FIG. 8, a process of generating an initial security key on a SeNB side is as follows:

S81 to S84 are the same as S71 to S74 in Embodiment 2, and details are not described herein again.

S85: The SeNB is triggered to perform local key refresh on the SeNB.

Preferably, after being triggered to perform local key refresh, the SeNB temporarily stops data transmission between the SeNB and the UE.

S86: The SeNB sends a key refresh instruction message to the MeNB, so as to instruct the MeNB to temporarily stop forwarding data of the UE to the SeNB.

S87: When receiving the key refresh instruction message sent by the SeNB, the MeNB temporarily stops forwarding data of the UE to the SeNB.

S88: The SeNB or the MeNB sends a key refresh instruction message to the UE.

The key refresh instruction message includes a PCI and frequency information of a target cell that are used for the current security key refresh and an NH value used for the current key refresh; or instruction information used to instruct to perform key refresh according to a PCI and a frequency of a current PCell of the UE, and an NH value used for the current key refresh.

S89: After receiving the key refresh instruction message, the UE stops performing data transmission between the UE and the SeNB, and starts to perform key refresh.

Specifically, the UE may generate a new security key $K_{eNB'}$ according to the PCI and frequency information of the SCell or PCell indicated in the key refresh instruction message. Further, the UE generates, according to the generated $K_{eNB'}$ and the security algorithm of the SeNB, a new key used for communication with the SeNB.

S810: The UE performs random access in a SCell indicated in the key refresh instruction message, and sends a key refresh complete message to the SeNB.

S811: After receiving the key refresh complete message sent by the UE, the SeNB sends a key refresh complete indication message to the MeNB, and after the SeNB completes local key refresh, the SeNB communicates with the UE by using a refreshed key.

S812: After receiving the key refresh complete indication message sent by the SeNB, the MeNB starts to resume forwarding data of the UE to the SeNB.

Embodiment 4

Figure 9:
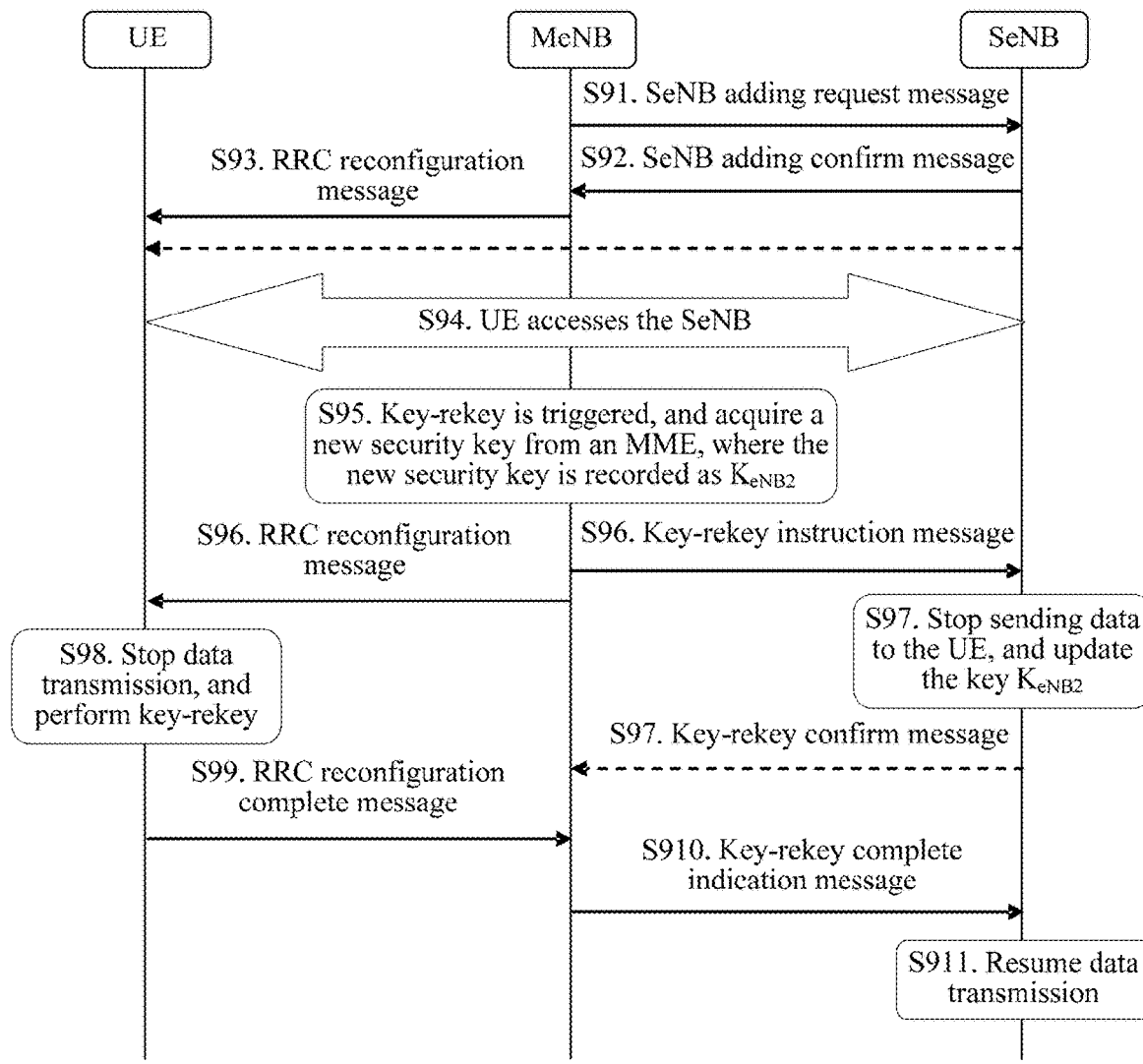
FIG. 9 is a schematic flowchart of Embodiment 4 according to an embodiment of the present disclosure.

In this embodiment, before key-rekey, a MeNB and a SeNB that serve UE use a same security key $K_{eNB}$ to generate respective keys used for communication with the UE. Referring to FIG. 9, a process of generating an initial security key on a SeNB side is as follows:

S91 to S94 are the same as S61 to S64 in Embodiment 1, and details are not described herein again.

After being triggered to perform key-rekey, the MeNB triggers a key-rekey process, which is specifically as follows:

S95: The MeNB is triggered to perform key-rekey, and acquires a new security key from an MME, where the new security key is recorded as $K_{eNB2}$.

Specifically, the MeNB may trigger key-rekey locally, or may trigger key-rekey after receiving a key-rekey request sent by the SeNB or the MME.

S96: The MeNB sends a key-rekey instruction message to the SeNB, where the key-rekey instruction message includes $K_{eNB2}$ that is acquired by the MeNB from the MME; and the MeNB sends an RRC reconfiguration message to the UE, where the RRC reconfiguration message includes instruction information used to instruct the UE to perform key-rekey.

This step does not limit a sequence of sending the RRC reconfiguration message by the MeNB to the UE and sending the key-rekey instruction message by the MeNB to the SeNB.

S97: After receiving the key-rekey instruction message sent by the MeNB, the SeNB acquires $K_{eNB2}$, and generates a new key such as a cipher key $K_{enc}$ and/or an integrity protection key $K_{int}$ according to $K_{eNB2}$ and the security algorithm of the SeNB. Further, after completing key-rekey, the SeNB sends a key-rekey confirm message to the MeNB, so as to report that the local key-rekey has been completed.

Preferably, after receiving the key-rekey instruction message sent by the MeNB, the SeNB temporarily stops data transmission between the SeNB and the UE.

S98: After receiving the RRC reconfiguration message, the UE stops performing data transmission, and starts to perform local key-rekey, including updating a key used for communication with the MeNB and a key used for communication with the SeNB.

Specifically, when determining, according to the instruction of the RRC reconfiguration message, that key-rekey needs to be performed, the UE first generates new $K_{ASME}$, which is recorded as $K_{ASME2}$; then, the UE generates new $K_{eNB2}$ according to $K_{ASME2}$ and a new COUNT value of a non-access stratum (Non-access Stratum, NAS). Further, the UE generates, according to the generated $K_{eNB2}$ and a security algorithm of the MeNB, a new key used for communication with the MeNB, for example, a new cipher key $K_{enc\_M}$ and/or integrity protection key $K_{int\_M}$; besides, the UE generates, according to the generated $K_{eNB2}$ and the security algorithm of the SeNB, a new key used for communication with the SeNB, for example, a new cipher key $K_{enc\_S}$ and/or integrity protection key $K_{int\_S}$.

S99: The UE performs random access in the target cell or PCell indicated in the RRC reconfiguration message, and sends an RRC reconfiguration complete message to the MeNB.

S910: After receiving the RRC reconfiguration complete message sent by the UE, the MeNB sends a key-rekey complete indication message to the SeNB, and after the MeNB completes local key-rekey, the MeNB communicates with the UE by using an updated key (such as a new cipher key $K_{enc\_M}$ and/or integrity protection key $K_{int\_M}$).

S911: After receiving the key-rekey complete indication message sent by the MeNB, and completing local key-rekey, the SeNB resumes, by using an updated key (such as a new cipher key $K_{enc\_S}$ and/or integrity protection key $K_{int\_S}$), communication with the UE.

Embodiment 5

Figure 10:
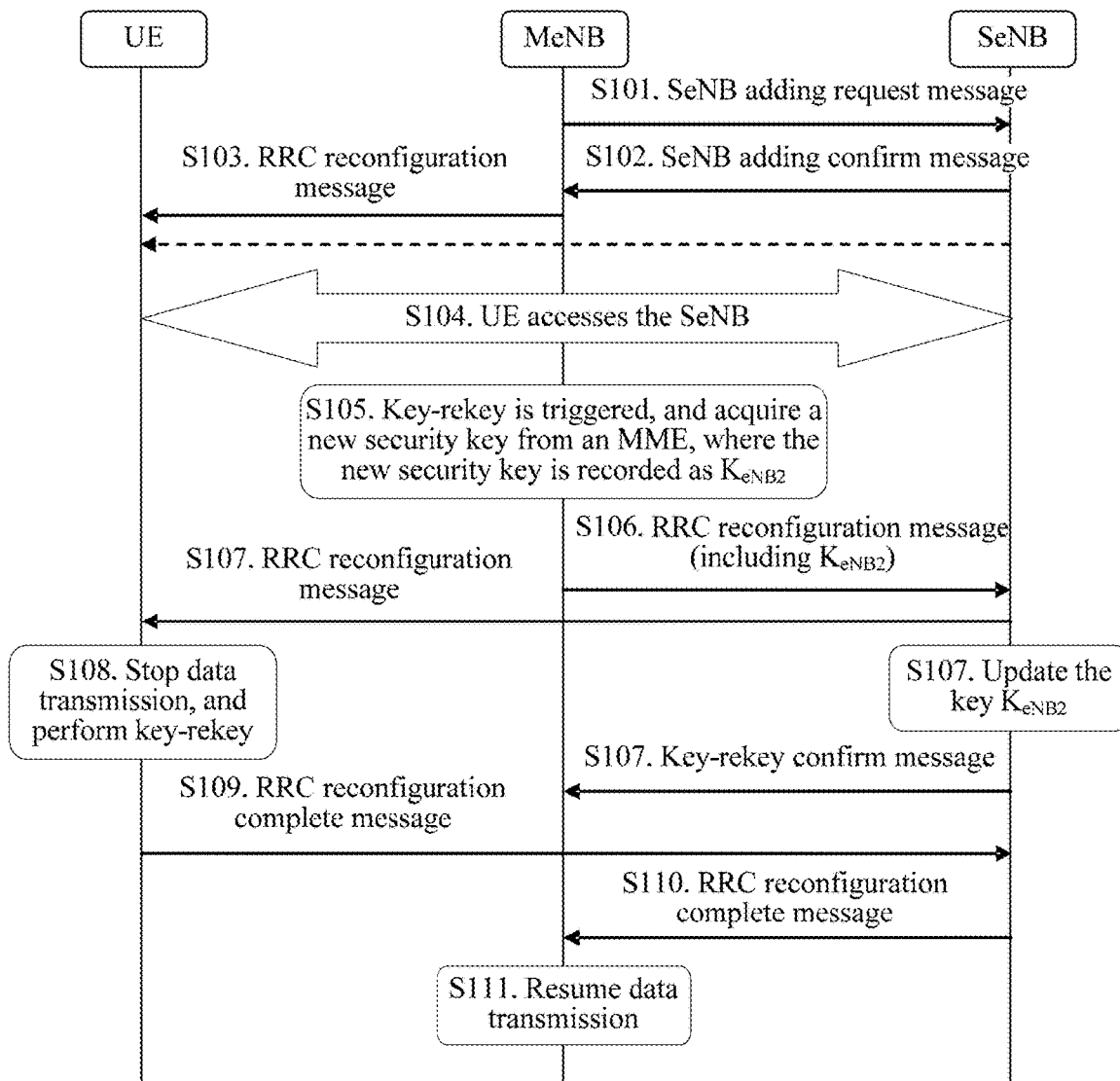
FIG. 10 is a schematic flowchart of Embodiment 5 according to an embodiment of the present disclosure.

This embodiment differs from Embodiment 4 in that, in this embodiment, a SeNB triggers, by using an RRC reconfiguration message, UE to perform key-rekey. Referring to FIG. 10, a process of generating an initial security key on a SeNB side is as follows:

S101 to S104 are the same as S61 to S64 in Embodiment 1, and details are not described herein again.

After being triggered to perform key-rekey, the MeNB triggers a key-rekey process, which is specifically as follows:

S105 to S106 are the same as S95 to S96 in Embodiment 4, and details are not described herein again.

S107: After receiving the RRC reconfiguration message sent by the MeNB, the SeNB acquires $K_{eNB2}$, and forwards the RRC reconfiguration message to the UE, where the RRC reconfiguration message does not include $K_{eNB2}$.

Further, the SeNB generates, by using $K_{eNB2}$ acquired from the RRC reconfiguration message, and the security algorithm of the SeNB, a new key used for communication with the UE, for example, a new cipher key $K_{enc\_S}$ and/or integrity protection key $K_{int\_S}$.

Preferably, after receiving the RRC reconfiguration message sent by the MeNB, the SeNB temporarily stops data transmission between the SeNB and the UE.

Further, after completing key-rekey, the SeNB sends a key-rekey confirm message to the MeNB, so as to report that the local key-rekey has been completed.

S108: After receiving the RRC reconfiguration message, the UE stops performing data transmission, and starts to perform key-rekey, including updating a key used for communication with the MeNB and a key used for communication with the SeNB.

Specifically, when determining, according to the instruction of the RRC reconfiguration message, that key-rekey needs to be performed, the UE first generates new $K_{ASME}$, which is recorded as $K_{ASME2}$; then, the UE generates new $K_{eNB2}$ according to $K_{ASME2}$ and a new COUNT value of a NAS. Further, the UE generates, according to the generated $K_{eNB2}$ and a security algorithm of the MeNB, a new key used for communication with the MeNB, for example, a new cipher key $K_{enc\_M}$ and/or integrity protection key $K_{int\_M}$; besides, the UE generates, according to the generated $K_{eNB2}$ and the security algorithm of the SeNB, a new key used for communication with the SeNB, for example, a new cipher key $K_{enc\_S}$ and/or integrity protection key $K_{int\_S}$.

S109: The UE performs random access in the target cell or PCell indicated in the RRC reconfiguration message, and sends an RRC reconfiguration complete message to the MeNB, where encryption and integrity protection of the RRC reconfiguration complete message are implemented by using a new cipher key $K_{enc\_S}$ and/or integrity protection key $K_{int\_S}$.

S110: After receiving the RRC reconfiguration complete message sent by the UE, the SeNB sends an RRC reconfiguration complete message to the MeNB, and after the SeNB completes local key-rekey, the SeNB communicates with the UE by using a new key (such as the new cipher key $K_{enc\_S}$ and/or integrity protection key $K_{int\_S}$).

S111: After receiving the RRC reconfiguration complete message sent by the SeNB, and completing local key-rekey, the MeNB resumes, by using a new key (such as a new cipher key $K_{enc\_M}$ and/or integrity protection key $K_{int\_M}$), communication with the UE.

Figure 11:
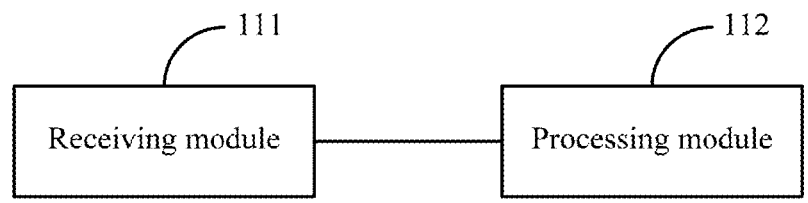
FIG. 11 is a schematic diagram of a base station according to an embodiment of the present disclosure.

Based on a same inventive concept, an embodiment of the present disclosure further provides a base station. As shown in FIG. 11, the base station includes:

a receiving module 111, configured to receive first request information sent by a first base station, where the first request information is used to request the base station to generate a key used for communication with a terminal; and a processing module 112, configured to generate, based on a security key carried in the first request information, the key used for communication with the terminal, where the base station and the first base station each have a communication connection to the terminal.

In implementation, the processing module 112 is specifically configured to:

generate, according to a first security key that is carried in the first request information and that is currently used by the first base station, the key used for communication with the terminal; or generate, according to a first security key that is carried in the first request information and that is currently used by the first base station, a security key different from the first security key, and generate, according to the generated security key, the key used for communication with the terminal.

Further, the generating, by the processing module 112, a security key different from the first security key specifically includes:

determining a PCI and frequency information of at least one cell covered by the base station, and generating, according to the PCI and the frequency information of the cell that are determined and the first security key, the security key different from the first security key.

In implementation, the processing module 112 is specifically configured to:

generate, according to a second security key that is carried in the first request information and that is generated by an MME for the base station, the key used for communication with the terminal.

In implementation, the processing module 112 is further configured to:

after the receiving module 111 receives the first request information sent by the first base station, send second request information to the terminal, where the second request information is used to request the terminal to generate a key used for communication with the base station.

In this embodiment of the present disclosure, the second request information includes a PCI and frequency information of a cell that are used to generate a security key of the base station; or the second request information includes instruction information used to instruct the terminal to generate the second security key for the base station.

In implementation, if the first base station and the base station generate, based on a same security key, respective keys used for communication with the terminal, the receiving module 111 is further configured to receive first key refresh instruction information sent by the first base station, where the first key refresh instruction information is used to instruct the base station to refresh the key used for communication with the terminal; and the processing module 112 is further configured to generate a new security key according to information carried in the first key refresh instruction information, and generate, according to the new security key, a key used for communication with the terminal.

In implementation, if the first base station and the base station generate, based on a same security key, respective keys used for communication with the terminal, the processing module 112 is further configured to:

after it is determined that key refresh needs to be performed, send first key refresh instruction information to the first base station, where the first key refresh instruction information is used to instruct the first base station to refresh the key used for communication with the terminal; and after first feedback information that is returned by the first base station to notify that current key refresh has been completed is received and the base station completes local key refresh, communicate with the terminal by using a refreshed key.

In implementation, the processing module 112 is further configured to:

after it is determined that key refresh needs to be performed, send second key refresh instruction information to the terminal, and after second feedback information that is returned by the terminal to notify that current key refresh has been completed is received, communicate with the terminal by using the refreshed key; or after the receiving module 111 receives the first key refresh instruction information sent by the first base station, send second key refresh instruction information to the terminal, and after second feedback information that is returned by the terminal to notify that current key refresh has been completed is received, notify the first base station that the terminal has completed the current key refresh;

where the second key refresh instruction information is used to instruct the terminal to refresh a key used for communication with the first base station and the key used for communication with the base station.

In this embodiment of the present disclosure, the first key refresh instruction information includes: a PCI and frequency information of a target cell that are used for the current key refresh and a next hop NH value used for the current key refresh; or instruction information used to instruct to perform key refresh by using a PCI and frequency information of a current primary cell of the terminal, and an NH value used for the current key refresh.

In implementation, if the first base station and the base station generate, based on different security keys, respective keys used for communication with the terminal, the processing module 112 is further configured to:

send first instruction information to the first base station after it is determined that local key refresh needs to be performed, where the first instruction information is used to instruct to temporarily stop forwarding data of the terminal to the base station; or send first instruction information to the first base station after it is determined that local key-rekey needs to be performed, where the first instruction information is used to instruct to temporarily stop forwarding data of the terminal to the base station.

In implementation, if the first base station and the base station generate, based on different security keys, respective keys used for communication with the terminal, the receiving module 111 is further configured to receive first instruction information sent by the first base station, where the first instruction information is used to instruct to temporarily stop data transmission related to the terminal; and the processing module 112 is further configured to temporarily stop data transmission related to the terminal, and after the receiving module 111 receives an instruction that is sent by the first base station and that is used to instruct to resume data transmission related to the terminal, resume data transmission related to the terminal.

In implementation, the processing module 112 is further configured to:

after it is determined that local key refresh needs to be performed, send second key refresh instruction information to the terminal, and after second feedback information that is returned by the terminal to notify that current key refresh has been completed is received, notify the first base station to resume data transmission related to the terminal, where the second key refresh instruction information is used to instruct the terminal to refresh the key used for communication with the base station; or after the receiving module 111 receives the first instruction information sent by the first base station, send second key refresh instruction information to the terminal, and after second feedback information that is returned by the terminal to notify that current key refresh has been completed is received, notify the first base station that the terminal has completed the current key refresh, where the second key refresh instruction information is used to instruct the terminal to refresh a key used for communication with the first base station; or after it is determined that local key-rekey needs to be performed, send second key-rekey instruction information to the terminal, and after second reply information that is returned by the terminal to notify that current key-rekey has been completed is received, notify the first base station to resume data transmission related to the terminal, where the second key-rekey instruction information is used to instruct the terminal to update the key used for communication with the base station; or after the receiving module 111 receives the first instruction information sent by the first base station, send second key-rekey instruction information to the terminal, and after second reply information that is returned by the terminal to notify that current key-rekey has been completed is received, notify the first base station that the terminal has completed the current key-rekey, where the second key-rekey instruction information is used to instruct the terminal to update a key used for communication with the first base station.

In this embodiment of the present disclosure, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Preferably, the second key refresh instruction information further includes information about a cell that is specified by the first base station or the base station for random access performed by the terminal.

In implementation, if the first base station and the base station generate, based on a same security key, respective keys used for communication with the terminal, the receiving module 111 is further configured to: receive first key-rekey instruction information sent by the first base station, where the first key-rekey instruction information carries a new security key that is acquired by the first base station from the MME; and the processing module 112 is further configured to: update, according to the new security key, the key used for communication with the terminal; and after completing the current key-rekey, return, to the first base station, first reply information used to notify that the current key-rekey has been completed.

In implementation, the processing module 112 is further configured to:

after the receiving module 111 receives the first key-rekey instruction information sent by the first base station, send second key-rekey instruction information to the terminal, and after second reply information that is returned by the terminal to notify that current key-rekey has been completed is received, notify the first base station that the terminal has completed the current key-rekey, where the second key-rekey instruction information is used to instruct the terminal to update a key used for communication with the first base station and the key used for communication with the base station.

In implementation, the processing module 112 is further configured to:

when it is determined that key refresh needs to be performed or the first key refresh instruction information sent by the first base station is received, temporarily stop data transmission related to the terminal; and after it is determined that both the base station and the terminal have completed local key refresh, resume, by using the refreshed key, data transmission related to the terminal;

or when it is determined that key-rekey needs to be performed or the first key-rekey instruction information sent by the first base station is received, temporarily stop data transmission related to the terminal; and after it is determined that both the base station and the terminal have completed local key-rekey, resume, by using an updated key, data transmission related to the terminal.

Figure 12:
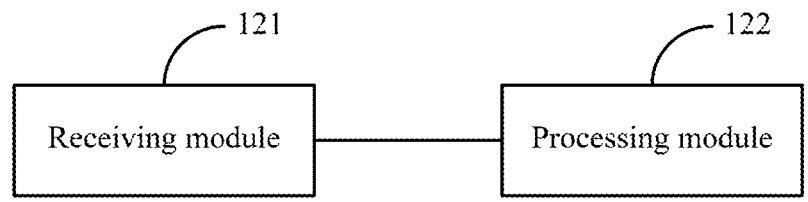
FIG. 12 is a schematic diagram of a terminal according to an embodiment of the present disclosure.

Based on a same inventive concept, an embodiment of the present disclosure further provides a terminal. As shown in FIG. 12, the terminal includes:

a receiving module 121, configured to receive second request information sent by a first base station or a second base station, where the second request information is used to request the terminal to generate a key used for communication with the second base station; and a processing module 122, configured to generate, according to the second request information, the key used for communication with the second base station.

In implementation, the processing module 122 is specifically configured to:

generate, according to a security algorithm used by the second base station and a first security key that is generated by the terminal for the first base station, the key used for communication with the second base station; or generate, according to a security algorithm used by the second base station and a PCI and frequency information of a cell that are included in the second request information and that are used to generate a security key of the second base station, the key used for communication with the second base station; or generate a second security key of the second base station according to stored security context information that is used to generate the second security key, and generate, according to the second security key, the key used for communication with the second base station.

In implementation, the processing module 122 is specifically configured to:

receive an identifier, indicated by an MME, of the security context information that is used to generate the second security key, and generate the second security key according to the stored security context information corresponding to the identifier.

In implementation, if the second request information carries the PCI and the frequency information of the cell that are used to generate the security key of the second base station, the processing module 122 is further configured to:

perform random access in the cell corresponding to the PCI and the frequency information that are included in the second request information and that are used to generate the security key of the second base station, so as to access the second base station; or perform random access in a cell that is included in the second request information and that is specified by the first base station or the second base station for random access performed by the terminal, so as to access the second base station.

In implementation, the receiving module 121 is further configured to: receive second key refresh instruction information sent by the first base station or the second base station, where the second key refresh instruction information is used to instruct the terminal to refresh a key used for communication with the first base station and/or the key used for communication with the second base station; and the processing module 122 is further configured to: generate a new security key according to information carried in the second key refresh instruction information, and generate, based on the new security key, a key used for communication with the first base station and/or a key used for communication with the second base station; and return, to the first base station or the second base station, second feedback information used to notify that current key refresh has been completed.

In this embodiment of the present disclosure, the second key refresh instruction information includes: a PCI and frequency information of a target cell that are used for the current key refresh and an NH value used for the current key refresh; or instruction information used to instruct to perform key refresh by using a PCI and frequency information of a current primary cell of the terminal, and an NH value used for the current key refresh.

Preferably, if the second key refresh instruction information further includes information about a cell that is specified by the first base station or the second base station for random access performed by the terminal, the terminal performs random access in the specified cell; or if the second key refresh instruction information instructs the terminal not to perform random access, the terminal does not perform random access.

In implementation, the receiving module 121 is further configured to: receive second key-rekey instruction information sent by the first base station or the second base station, where the second key-rekey instruction information is used to instruct the terminal to update a key used for communication with the first base station and the key used for communication with the second base station; and the processing module 122 is further configured to: generate a new security key according to stored security context information, and generate, according to the new security key, a key used for communication with the first base station and a key used for communication with the second base station; and return, to the first base station or the second base station, second reply information used to notify that current key-rekey has been completed.

In the following, structures and processing manners of the base station and the terminal provided by the embodiments of the present disclosure are described with reference to hardware structures.

Figure 13:
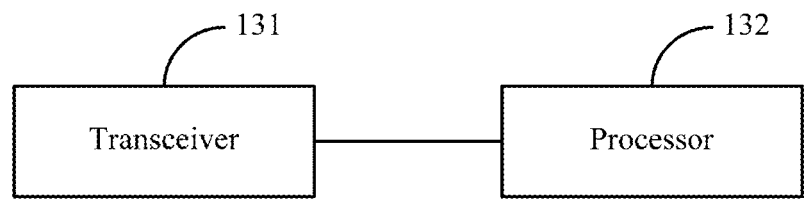
FIG. 13 is a schematic diagram of another base station according to an embodiment of the present disclosure.

Referring to FIG. 13, another base station provided by an embodiment of the present disclosure includes:
- a transceiver 131, configured to receive first request information sent by a first base station, where the first request information is used to request the base station to generate a key used for communication with a terminal; and
- a processor 132, configured to generate, based on a security key carried in the first request information, the key used for communication with the terminal,
- where the base station and the first base station each have a communication connection to the terminal.

In implementation, the processor 132 is specifically configured to:
- generate, according to a first security key that is carried in the first request information and that is currently used by the first base station, the key used for communication with the terminal; or
- generate, according to a first security key that is carried in the first request information and that is currently used by the first base station, a security key different from the first security key, and generate, according to the generated security key, the key used for communication with the terminal.

Further, the generating, by the processor 132, a security key different from the first security key specifically includes:
- determining a physical cell identifier PCI and frequency information of at least one cell covered by the second base station, and generating, according to the PCI and the frequency information of the cell that are determined and the first security key, the security key different from the first security key.

In implementation, the processor 132 is specifically configured to:
- generate, according to a second security key that is carried in the first request information and that is generated by an MME for the base station, the key used for communication with the terminal.

In implementation, the transceiver 131 is further configured to:
- after receiving the first request information sent by the first base station, send second request information to the terminal, where the second request information is used to request the terminal to generate a key used for communication with the base station.

In implementation, if the first base station and the base station generate, based on a same security key, respective keys used for communication with the terminal,
- the transceiver 131 is further configured to receive first key refresh instruction information sent by the first base station, where the first key refresh instruction information is used to instruct the base station to refresh the key used for communication with the terminal; and
- the processor 132 is further configured to generate a new security key according to information carried in the first key refresh instruction information, and generate, according to the new security key, a key used for communication with the terminal.

In implementation, if the first base station and the base station generate, based on a same security key, respective keys used for communication with the terminal, the processor 132 is further configured to:
- after it is determined that key refresh needs to be performed, trigger the transceiver 131 to send first key refresh instruction information to the first base station, where the first key refresh instruction information is used to instruct the first base station to refresh the key used for communication with the terminal; and after the transceiver 131 receives first feedback information that is returned by the first base station to notify that current key refresh has been completed and the base station completes local key refresh, communicate with the terminal by using a refreshed key.

In implementation, the processor 132 is further configured to: after it is determined that key refresh needs to be performed, trigger the transceiver 131 to send second key refresh instruction information to the terminal, and after the transceiver 131 receives second feedback information that is returned by the terminal to notify that current key refresh has been completed, communicate with the terminal by using the refreshed key;
or
the transceiver 131 is further configured to: after receiving the first key refresh instruction information sent by the first base station, send second key refresh instruction information to the terminal, and after receiving second feedback information that is returned by the terminal to notify that current key refresh has been completed, notify the first base station that the terminal has completed the current key refresh;
where the second key refresh instruction information is used to instruct the terminal to refresh a key used for communication with the first base station and the key used for communication with the base station.

In implementation, if the first base station and the base station generate, based on different security keys, respective keys used for communication with the terminal, the transceiver 131 is further configured to:
- after the processor 132 determines that local key refresh needs to be performed, send first instruction information to the first base station, where the first instruction information is used to instruct to temporarily stop forwarding data of the terminal to the base station; or
- after the processor 132 determines that local key-rekey needs to be performed, send first instruction information to the first base station, where the first instruction information is used to instruct to temporarily stop forwarding data of the terminal to the base station.

In implementation, if the first base station and the base station generate, based on different security keys, respective keys used for communication with the terminal,
- the transceiver 131 is further configured to receive first instruction information sent by the first base station, where the first instruction information is used to instruct to temporarily stop data transmission related to the terminal; and
- the processor 132 is further configured to temporarily stop data transmission related to the terminal, and after the transceiver 131 receives an instruction that is sent by the first base station and that is used to instruct to resume data transmission related to the terminal, resume data transmission related to the terminal.

In implementation, the transceiver 131 is further configured to:

after the processor 132 determines that local key refresh needs to be performed, send second key refresh instruction information to the terminal, and after receiving second feedback information that is returned by the terminal to notify that current key refresh has been completed, notify the first base station to resume data transmission related to the terminal, where the second key refresh instruction information is used to instruct the terminal to refresh the key used for communication with the base station; or after receiving the first instruction information sent by the first base station, send second key refresh instruction information to the terminal, and after receiving second feedback information that is returned by the terminal to notify that current key refresh has been completed, notify the first base station that the terminal has completed the current key refresh, where the second key refresh instruction information is used to instruct the terminal to refresh a key used for communication with the first base station; or after the processor 132 determines that local key-rekey needs to be performed, send second key-rekey instruction information to the terminal, and after second reply information that is returned by the terminal to notify that current key-rekey has been completed is received, notify the first base station to resume data transmission related to the terminal, where the second key-rekey instruction information is used to instruct the terminal to update the key used for communication with the base station; or after receiving the first instruction information sent by the first base station, send second key-rekey instruction information to the terminal, and after receiving second reply information that is returned by the terminal to notify that current key-rekey has been completed, notify the first base station that the terminal has completed the current key-rekey, where the second key-rekey instruction information is used to instruct the terminal to update a key used for communication with the first base station.

In implementation, if the first base station and the base station generate, based on a same security key, respective keys used for communication with the terminal, the transceiver 131 is further configured to: receive first key-rekey instruction information sent by the first base station, where the first key-rekey instruction information carries a new security key that is acquired by the first base station from the MME; and the processor 132 is further configured to: update, according to the new security key, the key used for communication with the terminal; and after completing the current key-rekey, trigger the transceiver 131 to return, to the first base station, first reply information used to notify that the current key-rekey has been completed.

In implementation, the transceiver 131 is further configured to:

after receiving the first key-rekey instruction information sent by the first base station, send second key-rekey instruction information to the terminal, and after receiving second reply information that is returned by the terminal to notify that current key-rekey has been completed, notify the first base station that the terminal has completed the current key-rekey, where the second key-rekey instruction information is used to instruct the terminal to update a key used for communication with the first base station and the key used for communication with the base station.

In implementation, the processor 132 is further configured to:

when it is determined that key refresh needs to be performed or the first key refresh instruction information sent by the first base station is received, temporarily stop data transmission related to the terminal; and after it is determined that both the base station and the terminal have completed local key refresh, resume, by using the refreshed key, data transmission related to the terminal;

or when it is determined that key-rekey needs to be performed or the first key-rekey instruction information sent by the first base station is received, temporarily stop data transmission related to the terminal; and after it is determined that both the base station and the terminal have completed local key-rekey, resume, by using an updated key, data transmission related to the terminal.

Figure 14:
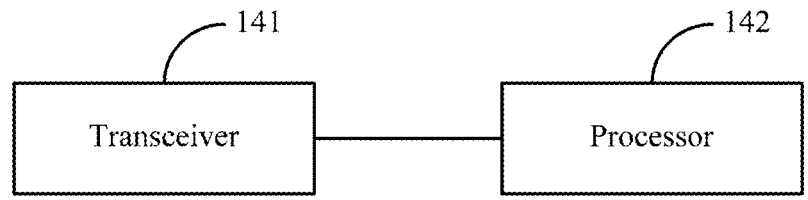
FIG. 14 is a schematic diagram of another terminal according to an embodiment of the present disclosure.

Referring to FIG. 14, an embodiment of the present disclosure provides another terminal, where the terminal has a communication connection to a first base station and a communication connection to a second base station, and includes:

a transceiver 141, configured to receive second request information sent by a first base station or a second base station, where the second request information is used to request the terminal to generate a key used for communication with the second base station; and a processor 142, configured to generate, according to the second request information, the key used for communication with the second base station.

In implementation, the processor 142 is specifically configured to:

generate, according to a security algorithm used by the second base station and a first security key that is generated by the terminal for the first base station, the key used for communication with the second base station; or generate, according to a security algorithm used by the second base station and a PCI and frequency information of a cell that are included in the second request information and that are used to generate a security key of the second base station, the key used for communication with the second base station; or generate a second security key of the second base station according to stored security context information that is used to generate the second security key, and generate, according to the second security key, the key used for communication with the second base station.

In implementation, the transceiver 141 is further configured to: receive an identifier, indicated by an MME, of the security context information that is used to generate the second security key; and the processor 142 is further configured to: generate the second security key according to the stored security context information corresponding to the identifier.

In implementation, if the second request information carries the PCI and the frequency information of the cell that are used to generate the security key of the second base station, the processor 142 is further configured to:

perform random access in the cell corresponding to the PCI and the frequency information that are included in the second request information and that are used to generate the security key of the second base station, so as to access the second base station; or perform random access in a cell that is included in the second request information and that is specified by the first base station or the second base station for random access performed by the terminal, so as to access the second base station.

In implementation, the transceiver 141 is further configured to: receive second key refresh instruction information sent by the first base station or the second base station, where the second key refresh instruction information is used to instruct the terminal to refresh a key used for communication with the first base station and/or the key used for communication with the second base station; and the processor 142 is further configured to: generate a new security key according to information carried in the second key refresh instruction information, and generate, based on the new security key, a key used for communication with the first base station and/or a key used for communication with the second base station; and trigger the transceiver 141 to return, to the first base station or the second base station, second feedback information used to notify that current key refresh has been completed.

In implementation, the transceiver 141 is further configured to: receive second key-rekey instruction information sent by the first base station or the second base station, where the second key-rekey instruction information is used to instruct the terminal to update a key used for communication with the first base station and the key used for communication with the second base station; and the processor 142 is further configured to: generate a new security key according to stored security context information, and generate, according to the new security key, a key used for communication with the first base station and a key used for communication with the second base station; and trigger the transceiver 141 to return, to the first base station or the second base station, second reply information used to notify that current key-rekey has been completed.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, embodiments of the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, a person skilled in the art can make various modifications and variations to the present embodiments without departing from the spirit and scope of the present disclosure. The present disclosure is intended to cover these modifications and variations provided that they fall within the scope of protection defined by the following claims and their equivalent technologies.

What is claimed is:

1. A key processing method in dual connectivity mode, the method comprising:

receiving, by a second base station, request information sent by a first base station,
wherein the request information is a request that the second base station generate a key used for communication with a mobile terminal, wherein each of the first base station and the second base station has a communication connection to the mobile terminal; and generating, by the second base station based on a security key currently used by the first base station and carried in the request information, the key used for communication with the mobile terminal;

wherein when the first base station and the second base station generate, based on different security keys, respective keys used for communication with the mobile terminal, the method further comprises:

receiving, by the second base station, first instruction information sent by the first base station after determining that local key refresh needs to be performed,
wherein the first instruction information is used to instruct the second base station to temporarily stop data transmission to the mobile terminal when the local key refresh is being performed;

temporarily stopping, by the second base station, data transmission to the mobile terminal during the local key refresh; and resuming, by the second base station, data transmission to the mobile terminal after receiving an instruction from the first base station to resume data transmission to the mobile terminal after completion of the local key refresh.

2. A key processing method in dual connectivity mode, the method comprising:
- receiving, by a mobile terminal that has a communication connection to a first base station and a communication connection to a second base station, request information sent by the first base station,
  - wherein the request information is a request that the mobile terminal generates a key used for communication with the second base station;
- generating, by the mobile terminal, according to the request information, the key used for communication with the second base station;
- receiving, by the mobile terminal, key refresh instruction information sent by the first base station,
  - wherein the key refresh instruction information is used to instruct the mobile terminal to refresh a key used for communication with the first base station and a key used for communication with the second base station;
- generating, by the mobile terminal, a first security key according to information carried in the key refresh instruction information, and
- generating, by the mobile terminal, based on the first security key, the key used for communication with the first base station and the key used for communication with the second base station; and
  - returning, by the mobile terminal, to the first base station, feedback information used to notify that the key refresh has been completed for the first base station and the second base station.

3. The method according to claim 2, wherein generating the key used for communication with the second base station is according to one of the following:
- a security algorithm used by the second base station and a first security key that is generated by the mobile terminal for the first base station; or
- a security algorithm used by the second base station and a physical cell identifier (PCI) and frequency information of a cell that are comprised in the request information and that are used to generate a second security key of the second base station; or
- a second security key of the second base station generated according to stored security context information.

4. The method according to claim 2, wherein when the key refresh instruction information further comprises information about a cell that is specified by the first base station or the second base station for random access performed by the mobile terminal, the mobile terminal performs random access in the specified cell.

5. The method according to claim 2, further comprising:
- receiving, by the mobile terminal, key-rekey instruction information sent by the first base station or the second base station, wherein the key-rekey instruction information instructs the mobile terminal to update a key used for communication with the first base station and the key used for communication with the second base station;
- generating, by the mobile terminal, a new security key according to stored security context information, and generating, according to the new security key, a key used for communication with the first base station and a key used for communication with the second base station; and
- returning, by the mobile terminal to the first base station or the second base station, second reply information used to notify that a key-rekey has been completed.

6. A second base station comprising:
- a processor;
- a receiver configured to cooperate with the processor to receive request information sent by a first base station, wherein the request information contains a request that the second base station generate a key used for communication with a mobile terminal;
- the processor configured to generate, based on a security key currently used by the first base station and carried in the request information, the key used for communication with the mobile terminal, wherein each of the second base station and the first base station has a communication connection to the mobile terminal;
- wherein when the first base station and the second base station generate, based on different security keys, respective keys used for communication with the mobile terminal:
- the receiver is further configured to receive first instruction information sent by the first base station after determining that local key refresh needs to be performed,
  - wherein the first instruction information is used to instruct to temporarily stop data transmission related to the mobile terminal when the local key refresh is being performed; and
- the processor is further configured to (i) temporarily stop data transmission related to the mobile terminal during the local key refresh and, (ii) after the receiver receives an instruction that is sent by the first base station and that is used to instruct to resume data transmission related to the mobile terminal after completion of the local key refresh, resume data transmission related to the mobile terminal.

7. A mobile terminal with a communication connection to a first base station and a communication connection to a second base station, the mobile terminal comprising:
- a processor;
- a receiver configured to cooperate with the processor to receive request information sent by the first base station, wherein the request information is a request that the mobile terminal generate a key used for communication with the second base station;
- the processor configured to generate, according to the request information, the key used for communication with the second base station;
- the receiver is further configured to cooperate with the processor to receive key refresh instruction information sent by the first base station,
  - wherein the key refresh instruction information is used to instruct the mobile terminal to refresh a key used for communication with the first base station and a key used for communication with the second base station; and
- the processor further configured to (i) generate a new security key according to information carried in the key refresh instruction information, (ii) generate, based on the new security key, the key used for communication with the first base station and the key used for communication with the second base station, and (iii) trigger the receiver to return to the first base station, feedback information used to notify that the key refresh has been completed for the first base station and the second base station.

8. The mobile terminal according to claim 7, wherein the processor is further configured to generate the key used for communication with the second base station according to one of the following:
- a security algorithm used by the second base station and a first security key that is generated by the mobile terminal for the first base station; or
- a security algorithm used by the second base station and a physical cell identifier (PCI) and frequency information of a cell that are comprised in the request information and that are used to generate a second security key of the second base station; or
- a second security key of the second base station generated according to stored security context information.

9. The method according to claim 7, wherein when the key refresh instruction information further comprises information about a cell that is specified by the first base station or the second base station for random access performed by the mobile terminal, the mobile terminal performs random access in the specified cell.

10. The mobile terminal according to claim 7, wherein:
the receiver is further configured to cooperate with the processor to receive key-rekey instruction information sent by the first base station or the second base station, wherein the key-rekey instruction information instructs the mobile terminal to update a key used for communication with the first base station and the key used for communication with the second base station; and
the processor is further configured to generate a new security key according to stored security context information, (ii) generate, according to the new security key, a key used for communication with the first base station and a key used for communication with the second base station, and (iii) trigger the receiver to return, to the first base station or the second base station, second reply information to notify that a key-rekey has been completed.

* * * * *